US010403197B2

(12) United States Patent
Nakagawa

(10) Patent No.: US 10,403,197 B2
(45) Date of Patent: Sep. 3, 2019

(54) GATE DRIVER IC, CHIP-ON-FILM SUBSTRATE, AND DISPLAY APPARATUS

(71) Applicant: JOLED INC., Tokyo (JP)

(72) Inventor: Hirofumi Nakagawa, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 15/126,082

(22) PCT Filed: Dec. 24, 2014

(86) PCT No.: PCT/JP2014/006422

§ 371 (c)(1),
(2) Date: Sep. 14, 2016

(87) PCT Pub. No.: WO2015/140862

PCT Pub. Date: Sep. 24, 2015

(65) Prior Publication Data

US 2017/0076664 A1 Mar. 16, 2017

(30) Foreign Application Priority Data

Mar. 20, 2014 (JP) ................................ 2014-059176

(51) Int. Cl.
*G06F 3/038* (2013.01)
*G09G 3/3225* (2016.01)
(Continued)

(52) U.S. Cl.
CPC ......... *G09G 3/3225* (2013.01); *G09G 3/3266* (2013.01); *G09G 3/3648* (2013.01);
(Continued)

(58) Field of Classification Search
None
See application file for complete search history.

(56) References Cited

U.S. PATENT DOCUMENTS 7,830,489 B2 11/2010 Kim
2007/0167036 A1* 7/2007 Kim .................... G09G 3/3611 439/66

(Continued)

FOREIGN PATENT DOCUMENTS

JP 2007-188078 7/2007
JP 2009-145470 7/2009

OTHER PUBLICATIONS

International Search Report, dated Mar. 31, 2015, in International Application No. PCT/JP2014/006422.

*Primary Examiner* — Jinsong Hu
*Assistant Examiner* — Alexander J Yi
(74) *Attorney, Agent, or Firm* — Greenblum & Berstein, P.L.C.

(57) ABSTRACT

A gate driver IC includes: N shift registers which generate a gate signal to be supplied to a display panel substrate, N being a natural number; (N+k) power supply terminals (PA1 to PD1, Pa1, and Pc1) for power supply from outside, k being a natural number; and (N+k) internal lines connected to the (N+k) power supply terminals, wherein N internal lines among the (N+k) internal lines connect, one-to-one, N power supply terminals among the (N+k) power supply terminals and the N shift registers, and k internal lines other than the N internal lines among the (N+k) internal lines connect, one-to-one, k power supply terminals other than the N power supply terminals among the (N+k) power supply terminals and k internal lines selected from among the N internal lines.

7 Claims, 26 Drawing Sheets

(51) Int. Cl.
*G09G 3/3266* (2016.01)
*G09G 3/36* (2006.01)

(52) U.S. Cl.
CPC ............... *G09G 2300/0408* (2013.01); *G09G 2300/0426* (2013.01); *G09G 2310/0286* (2013.01); *G09G 2330/028* (2013.01)

(56) References Cited

U.S. PATENT DOCUMENTS

| | | | | |
|---|---|---|---|---|
| 2008/0001898 | A1* | 1/2008 | Chang .................. | G09G 3/3611<br>345/100 |
| 2011/0050759 | A1* | 3/2011 | Katsutani ............. | G09G 3/3655<br>345/694 |
| 2012/0113090 | A1* | 5/2012 | Minami ............... | G09G 3/3648<br>345/213 |

* cited by examiner

FIG. 5

| | Voltage/signal supply unit V1 ↓ | V2 ↓ |
|---|---|---|
| (a) | A | BCD |
| (b) | AB | CD |
| (c)# | BD | AC |
| (d)# | BC | AD |
| (e) | ABC | D |
| (f)# | ABD | C |
| (g)# | B | ACD |

FIG. 7

| | Voltage/signal supply unit V1 ↓ | V2 ↓ | V3 ↓ |
|---|---|---|---|
| (a) | A | B | CD |
| (b) | AB | C | D |
| (c)# | B | D | AC |
| (d)# | B | C | AD |
| (e) | A | BC | D |
| (f)# | BD | A | C |

| | Voltage/signal supply unit V1 ↓ | V2 ↓ |
|---|---|---|
| (a) | A | BC |
| (b) | AB | C |
| (c)# | B | AC |

FIG. 13

| | Voltage/signal supply unit V1 ↓ | V2 ↓ |
|---|---|---|
| (a) | A | BCDE |
| (b) | AB | CDE |
| (c)# | BDE | AC |
| (d)# | BCE | AD |
| (e)# | BCD | AE |
| (f) | ABC | DE |
| (g)# | ABD | CE |
| (h)# | ABE | CD |
| (i)# | BE | ACD |
| (j)# | BD | ACE |
| (k)# | BC | ADE |
| (l) | ABCD | E |
| (m)# | ABCE | D |
| (n)# | B | ACDE |
| (o)# | ABDE | C |

FIG. 15

| | Voltage/signal supply unit V1 ↓ | V2 ↓ | V3 ↓ |
|---|---|---|---|
| (a) | A | B | CDE |
| (b) | AB | C | DE |
| (c)# | AB | D | CE |
| (d) | AB | CD | E |
| (e)# | B | DE | AC |
| (f)# | BE | AC | D |
| (g)# | BD | E | AC |
| (h)# | B | CE | AD |
| (i)* | BE | AD | C |
| (j)# | BC | E | AD |
| (k)# | B | CD | AE |
| (l)# | BD | AE | C |
| (m)# | BC | D | AE |
| (n) | ABC | D | E |
| (o)# | ABD | E | C |
| (p)# | ABE | C | D |
| (q)# | B | E | ACD |
| (r)# | B | D | ACE |
| (s)# | B | C | ADE |
| (t)# | A | BC | DE |
| (u)# | A | BD | CE |
| (v)# | A | BE | CD |
| (w) | A | BCD | E |
| (x)# | A | BCE | D |
| (y)# | A | BDE | C |

FIG. 17

| | Voltage/signal supply unit V1 ↓ | V2 ↓ | V3 ↓ | V4 ↓ |
|---|---|---|---|---|
| (a) | A | B | C | DE |
| (b) | AB | C | D | E |
| (c)# | B | D | E | AC |
| (d)# | B | C | E | AD |
| (e)# | B | C | D | AE |
| (f) | A | BC | D | E |
| (g)# | A | BD | E | C |
| (h)# | A | BE | C | D |
| (i) | A | B | CD | E |
| (j)# | A | B | CE | D |

GATE DRIVER IC, CHIP-ON-FILM SUBSTRATE, AND DISPLAY APPARATUS

TECHNICAL FIELD

The present disclosure relates to a gate driver IC which generates a gate signal to be supplied to a display panel substrate, and to a chip-on-film substrate and a display apparatus.

BACKGROUND ART

In a flat panel display apparatus such as a liquid crystal display apparatus and an organic EL display apparatus, a display panel substrate and a chip-on-film (COF) substrate which mounts a driver IC are connected by thermal bonding using an anisotropic conductive film (ACF). Here, an ACF is a material obtained by mixing conductive particles to a bonding agent and forming the mixture into a tape. In an ACF connection, an ACF is sandwiched and thermally bonded between terminal parts of different substrates to electrically connect the terminals arranged vertically via conductive particles and insulate the terminals in each of the substrates at the same time, so that the substrates are bonded when the bonding agent is cured. Such ACF connection can be used in replacement for connection by connectors, and, compared with the case of using such connectors, enables connection on a thinner film substrate using a larger number of pins arranged at smaller pitches.

Patent Literature 1 discloses a flexible circuit substrate which is a COF substrate having a reduced wiring resistance. This flexible circuit substrate includes a base substrate, driver chips, input transmission lines, and output transmission lines, and coupling transmission lines. The driver chips are arranged on a surface of the base substrate. The input transmission lines are formed on the surface of the base substrate, and are electrically coupled to the input terminals of the driver chips. The output transmission lines are formed on the surface of the base substrate, and are electrically coupled to the output terminals of the driver chips. The coupling transmission lines electrically couple the input transmission lines and the output transmission lines.

In this way, on the flexible substrate in Patent Literature 1, coupling transmission lines for electrically coupling the input transmission lines and the output transmission lines are formed to reduce the wiring resistance in the flexible circuit substrate.

CITATION LIST

Patent Literature

[PTL 1]

Japanese Unexamined Patent Application Publication No. 2007-188078

SUMMARY OF INVENTION

Technical Problem

However, there is a problem that the flexibility in designing the connection of power supply lines between the conventional COF substrate and the display panel substrate is low.

More specifically, the lines such as the input transmission lines, the output transmission lines, the coupling transmission lines etc. on the COF substrate are formed on the surface of the film-shaped base substrate without allowing the lines to be crossed by another one of the lines. In this way, since the wiring layer on the COF substrate is a single layer, reduction in cost is attempted. In addition, lines around the display panel substrate (for example, a glass substrate) are formed on the surface of the display panel substrate without being crossed by another one of the lines. For this reason, there is a problem of the low flexibility in designing the connection of power supply lines between the display panel substrate and the COF substrate.

The present disclosure has an object to increase the flexibility in designing the connection of power supply lines between either a COF substrate or a gate driver IC and a display panel substrate.

Solution to Problem

In order to solve the above problem, a gate driver IC according to the present disclosure includes: N shift registers which generate a gate signal to be supplied to a display panel substrate, N being a natural number; (N+k) power supply terminals for power supply from outside, k being a natural number; and (N+k) internal lines connected to the (N+k) power supply terminals, wherein N internal lines among the (N+k) internal lines connect, one-to-one, N power supply terminals among the (N+k) power supply terminals and the N shift registers, and k internal lines other than the N internal lines among the (N+k) internal lines connect, one-to-one, k power supply terminals other than the N power supply terminals among the (N+k) power supply terminals and k internal lines selected from among the N internal lines.

Advantageous Effects of Invention

With this configuration, it is possible to increase the flexibility in designing the connection between the chip-on-film substrate and the display panel substrate and the connection between the gate driver IC and the display panel substrate, and thus to further increase the versatility.

BRIEF DESCRIPTION OF DRAWINGS

FIG. 5 is a diagram illustrating a combination of a shift register to which a power supply voltage V1 is supplied and a shift register to which a power supply voltage V2 is supplied in the case where the number of power supply voltages is reduced to two according to Embodiment 1.

FIG. 7 is a diagram illustrating combinations of shift registers to which power supply voltages V1, V2, and V3 are supplied in the case where the number of power supply voltages is reduced to three according to Embodiment 1.

FIG. 13 is a diagram illustrating a combination of a shift register to which a power supply voltage V1 is supplied and a shift register to which a power supply voltage V2 is supplied in the case where the number of power supply voltages is reduced to two according to Embodiment 3.

FIG. 15 is a diagram illustrating a combination of shift registers to which power supply voltages V1, V2, and V3 are supplied in the case where the number of power supply voltages is reduced to three according to Embodiment 3.

FIG. 17 is a diagram illustrating a combination of shift registers to which power supply voltages V1 to V4 are supplied in the case where the number of power supply voltages is reduced to four according to Embodiment 3.

DESCRIPTION OF EMBODIMENTS (Underlying Knowledge Forming Basis of the Present Disclosure)

The Inventor found that problems below arise in connection with the conventional flat panel display apparatus described in the section of "Background Art". This problem is described with reference to FIGS. 1A and 1B.

Figure 1A:
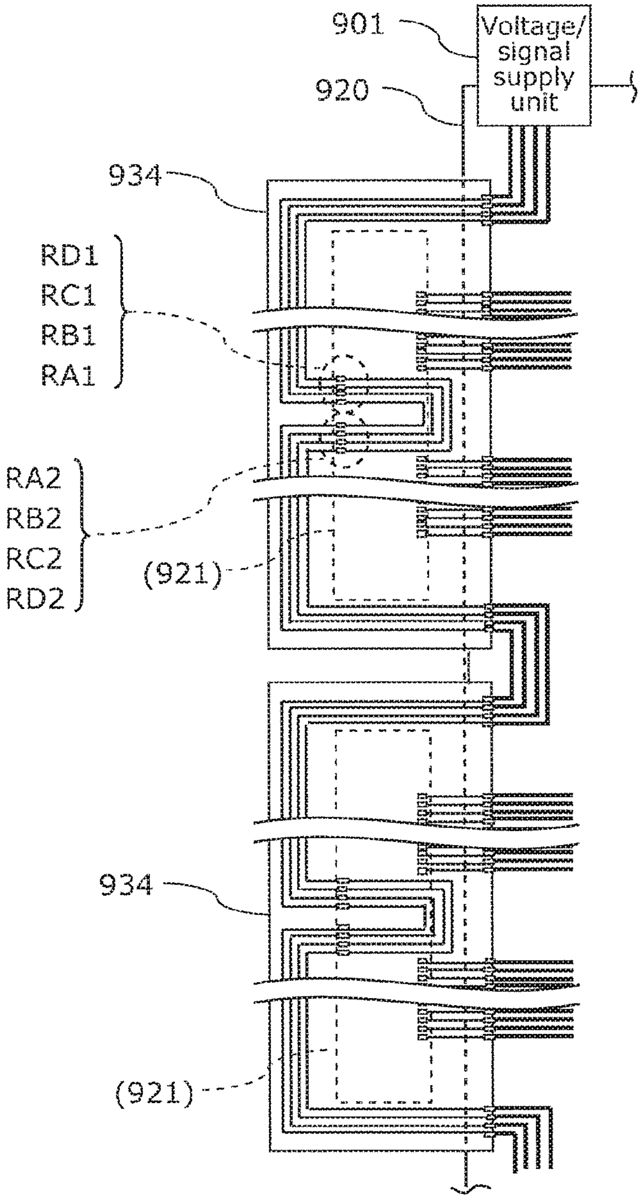
FIG. 1A is a diagram illustrating a connection example of a display panel substrate and a COF substrate in a conventional flat panel display apparatus.
Figure 1B:
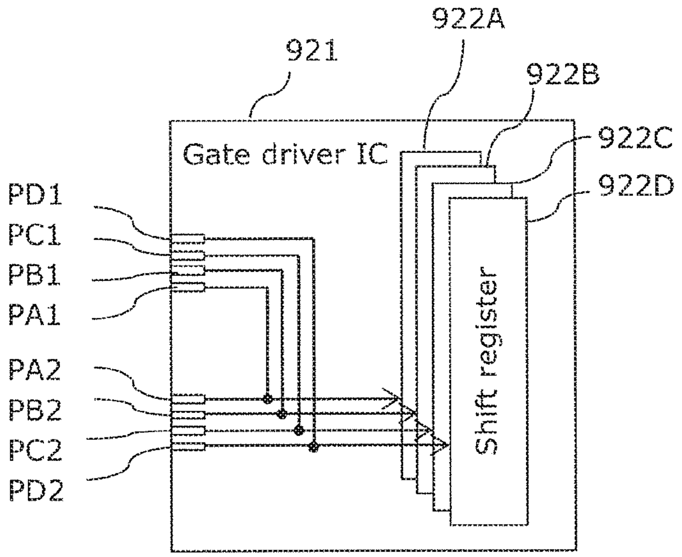
FIG. 1B is a block diagram illustrating a configuration example of a gate driver IC.

FIG. 1A is a diagram illustrating a connection example of a display panel substrate and a COF substrate in the conventional flat panel display apparatus. FIG. 1B is a block diagram illustrating a configuration example of a gate driver IC.

The flat panel display apparatus in FIG. 1A includes: a voltage/signal supply unit 901; a display panel substrate 920; and a COF substrate 934.

The voltage/signal supply unit 901 is a film-shaped substrate, is connected at its lower part to the display panel substrate 920 using an anisotropic conductive film (ACF) and is connected at its upper part to a printed board using an ACF. The voltage/signal supply unit 901 includes line groups which relay power supplies and various kinds of signals to be supplied from the display control circuit called a timing controller (TCON) on the printed board to the film substrate 934. Four lines connected to the voltage/signal supply unit 901 illustrated in FIG. 1A are power supply lines. The lines for various kinds of signals other than the power supply lines to be connected to the voltage/signal supply unit 901 are not illustrated.

The film substrate 934 is a chip-on-film (COF) substrate which mounts a gate driver IC 921. In the rectangular dotted-line frame illustrated on the film substrate 934 in FIG. 1A, the gate driver IC 921 in FIG. 1B is mounted. In the rectangular dotted-line frame in FIG. 1A, power supply lines formed on the film substrate 934 are clearly illustrated. In addition, lines connected at the right side of the rectangular dotted-line frame are various kinds of gate signal lines which are provided to the display panel substrate 920.

The film substrate 934 includes, at its right side, a sequence of pads to be connected to the display panel substrate 920 using an ACF. In the pad sequence, the pads other than the uppermost four pads and the lowermost four pads at the right side of each film substrate 934 are pads for outputting gate signals.

The uppermost four pads of the pad sequence are connected to four power supply lines of the display panel substrate 920, and receive supply of power supply voltages from the voltage/signal supply unit 101. These four pads are connected to the lowermost four pads via the pads RA1 to RD1 and pads RA2 to Rd2 inside the film substrate 934.

The pads RA1 to RD1 and pads RA2 to RD2 are connected to the power supply terminals PA1 to PD1 and PA2 to PD2 of the gate driver IC 921, respectively.

In addition, the lowermost four pads of the pad sequence are for supplying power supply voltages to the film substrate 934 arranged below.

The gate driver IC 921 in FIG. 1B includes four shift registers 922A to 922D and power supply terminals PA1 to PD1 and PA2 to PD2 which input power supply voltages from outside. The power supply voltages input to the power supply terminals PA1 to PD1 and PA2 to PD2 are supplied, one-to-one, to the shift registers 922A to 922D as power supply voltages via lines.

The four shift registers 922A to 922D are provided because each of the pixel circuits 16 includes four switch transistors and, and because the four switch transistors are assumed to be driven by four kinds of gate signals. Voltages to be supplied to either the drains and supplies of the switch transistors in each pixel circuit 16 vary in many cases, voltages to be applied to the gates should correspond thereto. Each of the shift registers 922A to 922D outputs a gate signal which switches ON and OFF a corresponding one of the switch transistors. In view of this, in order to enable supply of power supply voltages to the respective shift registers 922A to 922D, the four kinds of power supply terminals are provided respectively therefor. In other words, the four kinds of power supply terminals are connected, one-to-one, to the shift registers 922A to 922D, and configured to be able to supply different power supply voltages.

However, as described above, the configuration as in FIG. 1A has problems that the flexibility in designing connection of power supply lines with the gate driver IC and the display panel substrate is low, and that the versatility of the gate driver IC and the COF substrate is low.

More specifically, some of the shift registers 922A to 922D may be able to share a power supply voltage.

For example, even when the shift register 922A and the shift register 922C can share the same power supply voltage, four power supply lines are required on the display panel substrate 20, and the number of lines cannot be reduced. In the case where the shift register 922A and the shift register 922B can share the same power supply voltage, only three power supply lines are required on the display panel substrate 20, and the number of lines can be reduced.

In other words, when a power supply voltage is shared between two adjacent power supply lines, it is possible to design wiring for reducing the number of power supply lines on the display panel substrate 920. However, when a power supply voltage is shared between two non-adjacent power supply lines, it is impossible to design such wiring for reducing the number of power supply lines. Here, it is assumed that lines which do not cross at an area around the display panel substrate 920, that is, lines in a single layer are used.

The power supply lines are generally formed to be wider than the other signal lines, and thus the area around the display panel substrate 920 requires a large width. It is helpful to slim the bezel of the display apparatus if the number of power supply lines can be reduced. In addition, if the number of power supply lines can be selectively reduced or not with a high flexibility, the versatility of the gate driver IC and the COF substrate is increased. In other words, such wiring is applicable to different kinds of display panel substrates.

In view of this, the Inventor provides a gate driver IC, a COF substrate, and a display apparatus which make it possible to select a design for reducing the number of power supply lines or a design for not reducing the same with a high flexibility in designing the connection of the power supply lines, and which are highly versatile.

In order to achieve the object, the gate driver IC according to the present disclosure includes N shift registers which generate a gate signal to be supplied to a display panel substrate, N being a natural number; (N+k) power supply terminals for power supply from outside, k being a natural number; and (N+k) internal lines connected to the (N+k) power supply terminals. N internal lines among the (N+k) internal lines connect, one-to-one, N power supply terminals among the (N+k) power supply terminals and the N shift registers. In addition, k internal lines other than the N internal lines among the (N+k) internal lines connect, one-to-one, k power supply terminals other than the N power supply terminals among the (N+k) power supply terminals and k internal lines selected from among the N internal lines.

With this configuration, the k power supply terminals are redundantly provided, and the k internal lines connect, one-to-one, the k power supply terminals and the k internal lines selected from among the N internal lines. Thus, a power supply voltage can be shared between power supply terminals which are not adjacent to each other among the N power supply terminals. In other words, in the gate driver IC, the COF substrate, and the display apparatus, it is possible to design the gate driver IC, the COF substrate, and the display apparatus to have a reduced or not reduced number of power supply lines. Therefore, the flexibility in designing the power supply lines is high, and thus it is possible to increase versatility.

Hereinafter, an embodiment is described in detail referring to the drawings as necessary. It should be noted that unnecessarily detailed descriptions may be omitted below. For example, detailed descriptions about already well-known matters and overlapping descriptions for substantially the same configurations may be omitted. Such descriptions are omitted to prevent the descriptions below from being unnecessarily redundant and help a person skilled in the art to understand the present disclosure easily.

It should be noted that the Inventor provides the attached drawings and descriptions below to allow the person skilled in the art to fully understand the present disclosure, and do not intend to restrict the subject matters of the Claims by the disclosure thereof.

Hereinafter; display apparatuses according to embodiments of the present invention are described with reference to the drawings.

Embodiment 1

In this embodiment, detailed descriptions are given of a display apparatus, a gate driver IC, a COF substrate in the case where a combination of N and k (N, k) is (4, 2). Here, N is the maximum number for a power supply voltage to be supplied to a gate driver IC, and is also the number of shift registers in the gate driver. Here, k is the number for a power supply terminals redundantly provided to the gate driver IC, and is also the number of redundant internal lines. This redundancy increases flexibility in power supply wiring.

First, an entire configuration of the display apparatus is described.

[1. Configuration of Display Apparatus]

Figure 2:
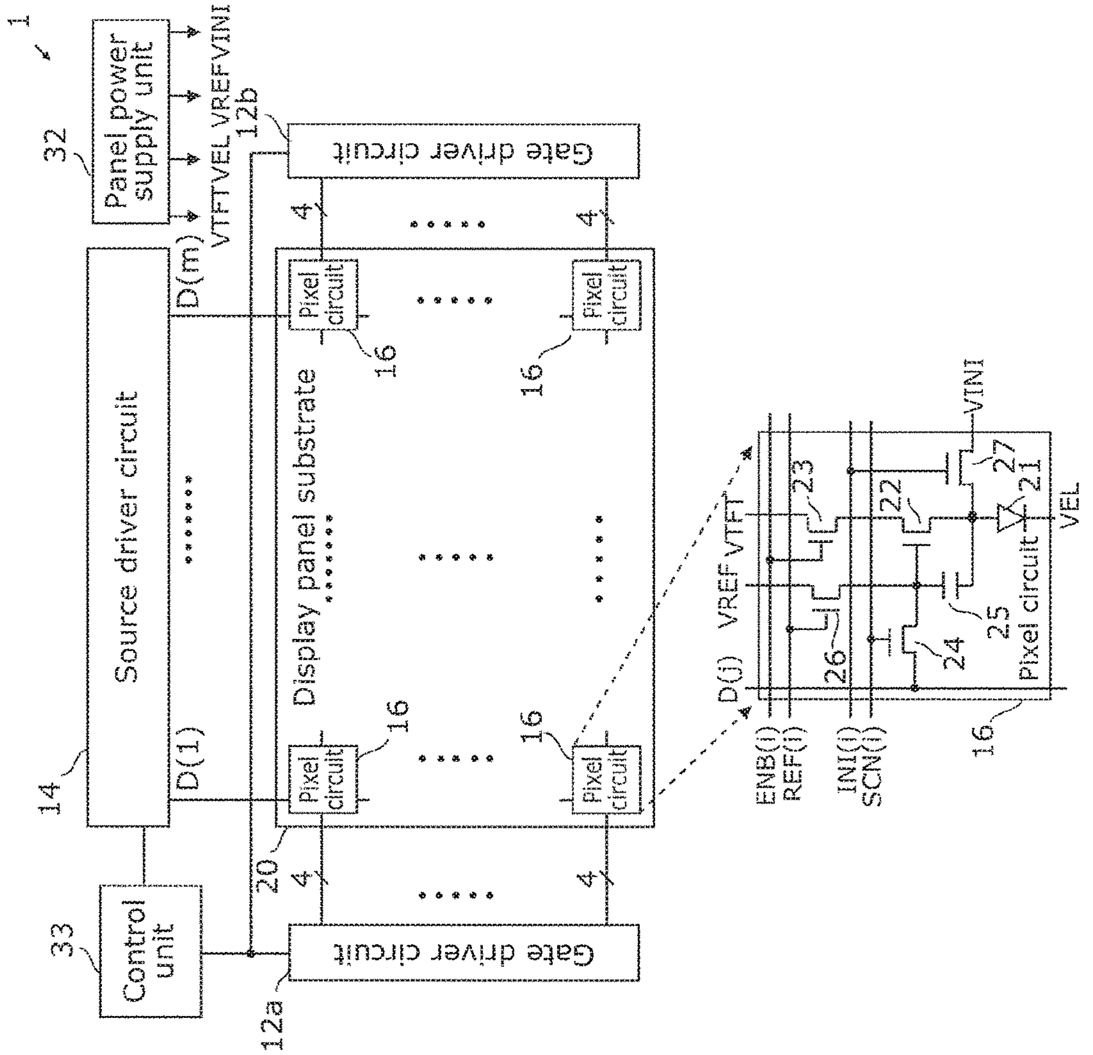
FIG. 2 is a block diagram illustrating a configuration example of a display apparatus and a pixel circuit according to Embodiment 1.

FIG. 2 is a block diagram illustrating an example in which the display apparatus and a pixel circuit are configured according to Embodiment 1. The display apparatus 1 in the drawing includes: a display panel substrate 20; gate driver circuits 12*a* and 12*b*; a source driver circuit 14; a control unit 33; and a panel power supply unit 32.

[1-1. Configuration of Display Panel Substrate]

Here, an example of a circuit configuration of the display panel substrate 20 is described.

The display panel substrate 20 includes a plurality of pixel circuits 16 arranged in a matrix. The plurality of pixel circuits 16 are formed on the display panel substrate 20 by a semiconductor process. A material for the display panel substrate 20 is glass or a resin (such as acryl or the like).

The plurality of pixel circuits 16 are arranged in n rows and m columns. Here, n and m vary depending on the size and resolution of the display panel substrate 20. For example, in the case where pixel circuits 16 corresponding to the three RGB primary colors are adjacent in the case of a resolution referred to as a high definition (HD), n and m are 1080 lines and 1920×3 columns, respectively.

Each of the pixel circuits 16 makes up a light-emitting pixel having one of the three RGB primary colors. The pixel circuit 16 includes: a light-emitting element 21; a driver transistor 22; an enable switch 23; a scan switch 24; a capacitor element 25; an REF switch 26; and an INI switch 27.

In addition, the pixel circuit 16 belonging to the i-th row (i is an integer ranging from 1 to n) is connected to an ENB (i) signal line, an REF (i) signal line, an INI (i) signal line, and an SCN (i) signal line. For these signal lines, an enable signal, an REF control signal, an INI control signal, and a scan signal are supplied from the gate driver circuits 12*a* and 12*b*.

The ENB (i) signal line transmits an enable signal which causes the pixel circuit 16 belonging to the i-th row to emit and not to emit light. The enable signal controls ON and OFF of the enable switch 23 in the corresponding pixel circuit 16.

The SCN (i) signal line transmits a scan signal (also referred to as a writing signal) which controls writing of pixel data to the pixel circuit 16 belonging to the i-th row. The scan signal controls ON and OFF of the scan switch 24 in the corresponding pixel circuit 16.

The REF (i) signal line transmits an REF control signal which controls supply of a reference voltage to the pixel circuit 16 belonging to the i-th row. The REF signal controls ON and OFF of the REF switch 26 in the corresponding pixel circuit 16.

The INI (i) signal line transmits an INI control signal which controls supply of an initialization voltage to the pixel circuit 16 belonging to the i-th row. The INI control signal controls ON and OFF of the INI switch 27 in the corresponding pixel circuit 16.

In addition, the pixel circuit 16 belonging to a j-th row (j is an integer ranging from 1 to m) is connected to a D (j) signal line. The D (j) signal line receives supply of a voltage corresponding to a luminance of light to be emitted, from the source driver circuit 14.

The D signal line is a data line which transmits, as pixel data, a voltage indicating the brightness of a pixel, to pixel circuit 16 belonging to the j-th row. This pixel data is given to the capacitor element 25 under control by a scan signal via the scan switch 24.

Hereinafter, and (j) in the names of the various kinds of signal lines are not assigned in the case where the positions of the pixel circuits 16 are not particularly identified.

In the pixel circuit 16 in FIG. 1, the light-emitting element 21 is an example of an organic EL element which is also referred to as an organic light-emitting diode (OLED), and emits light at brightness according to the magnitude of a current flowing in the circuit itself. The anode of the light-emitting element 21 is connected to the supply of the driver transistor 22, and the cathode of the light-emitting element 21 is connected to a power supply line VEL.

The driver transistor 22 is a driver which supplies a current to the light-emitting element 21. The gate of the driver transistor 22 is connected to one of the electrodes of the capacitor element 25, and the supply of the driver transistor 22 is connected to the other electrode and the anode of the light-emitting element 21. With this connection, a voltage held in the capacitor element 25, that is, a voltage indicating the brightness of the pixel is applied to between the gate and supply of the driver transistor 22. In this way, the driver transistor 22 supplies a current whose amount corresponds to the voltage of the capacitor element 25 to the light-emitting element 21.

The enable switch 23 is a switch transistor which switches ON and OFF supply of a current by the driver transistor 22 to the light-emitting element 21. The enable switch 23 switches ON and OFF according to an enable signal.

The scan switch 24 is a switch transistor for writing a voltage indicating the brightness of the pixel as pixel data to the capacitor element 25. The scan signal is a writing signal for selecting pixel circuits 16 from among the plurality of pixel circuits 16 arranged in a matrix on a per row basis, and writing a voltage indicating a luminance to the pixel circuits 16 belonging to the selected row.

The capacitor element 25 holds, as pixel data, a voltage indicating the brightness of a pixel between the gate and supply of the driver transistor 22.

The REF switch 26 is a switch transistor for supplying a reference voltage VREF to one of the electrodes of the capacitor element 25. In addition, the INI switch 27 is a switch transistor for supplying an initialization voltage VINI to the other electrodes of the capacitor element 25. The REF switch 26 and the INI switch 27 are used for a threshold value compensation operation for causing the capacitor element 25 to hold a voltage corresponding to an actual threshold value voltage of the driver transistor 22 to which the capacitor element 25 is connected.

The circuitry including the display panel substrate 20 illustrated in FIG. 2 is configured as described above.

[1-2. Configurations of Parts Other than Display Panel Substrate 20]

Next, configurations of the parts surrounding the display panel substrate 20 are described.

The gate driver circuits 12*a* and 12*b* drive the same gate signal to the display panel substrate 20 at the same timing. This is to reduce signal deterioration by wiring capacitance of each signal line in a large display apparatus. In a small display apparatus, the gate driver circuit 12 may be only one.

Here, the gate signals are signals that are input to the gate of each switch transistor inside the pixel circuit 16. In the case of the pixel circuit 16 in FIG. 2, the gate signals are categorized into four types which are an enable signal, an REF control signal, an INI control signal, and a scan signal.

The gate driver circuit 12*b* has the same configuration as that of the gate driver circuit 12*a*, and outputs the same signal as the one output by the gate driver circuit 12*a* at the same timing.

The source driver circuit 14 supplies a voltage indicating the brightness of pixels belonging to respective columns, to signal lines D (1) to D (m), based on video signals to be input from the control unit 33. The supplied voltage is written into the pixel circuit 16 belonging to the row selected by the scan signal line. In addition, for example, video signals input from the control unit 33 to the source driver circuit 14 are input as digital serial data for the respective three RGB primary colors, converted into parallel data inside the source driver circuit 14 on a per row basis, and further converted into analog data on a per row basis.

Although only one source driver circuit 14 is illustrated in FIG. 2, it to be noted that a large display apparatus may include two source driver circuits arranged vertically and outputs the same signals at the same timing.

The control unit 33 controls operations of the entire display apparatus. According to a vertical synchronization signal and a horizontal synchronization signal of a video signal from outside, the control unit 33 instructs the gate driver circuits 12*a* and 12*b* to start scanning, and supplies the digital serial data to the source driver circuit 14.

The panel power supply unit 32 supplies various kinds of voltages to the respective pixel circuits 16 of the display panel substrate 20. In the example of a pixel circuit illustrated in FIG. 2, the various kinds of voltages here are VTFT, VEL, VREF, and VINI. The panel power supply unit 32 is capable of switching ON and OFF supply of the voltages under control by the control unit 33.

[1-3. Substrate Configuration of Display Apparatus]

Figure 3:
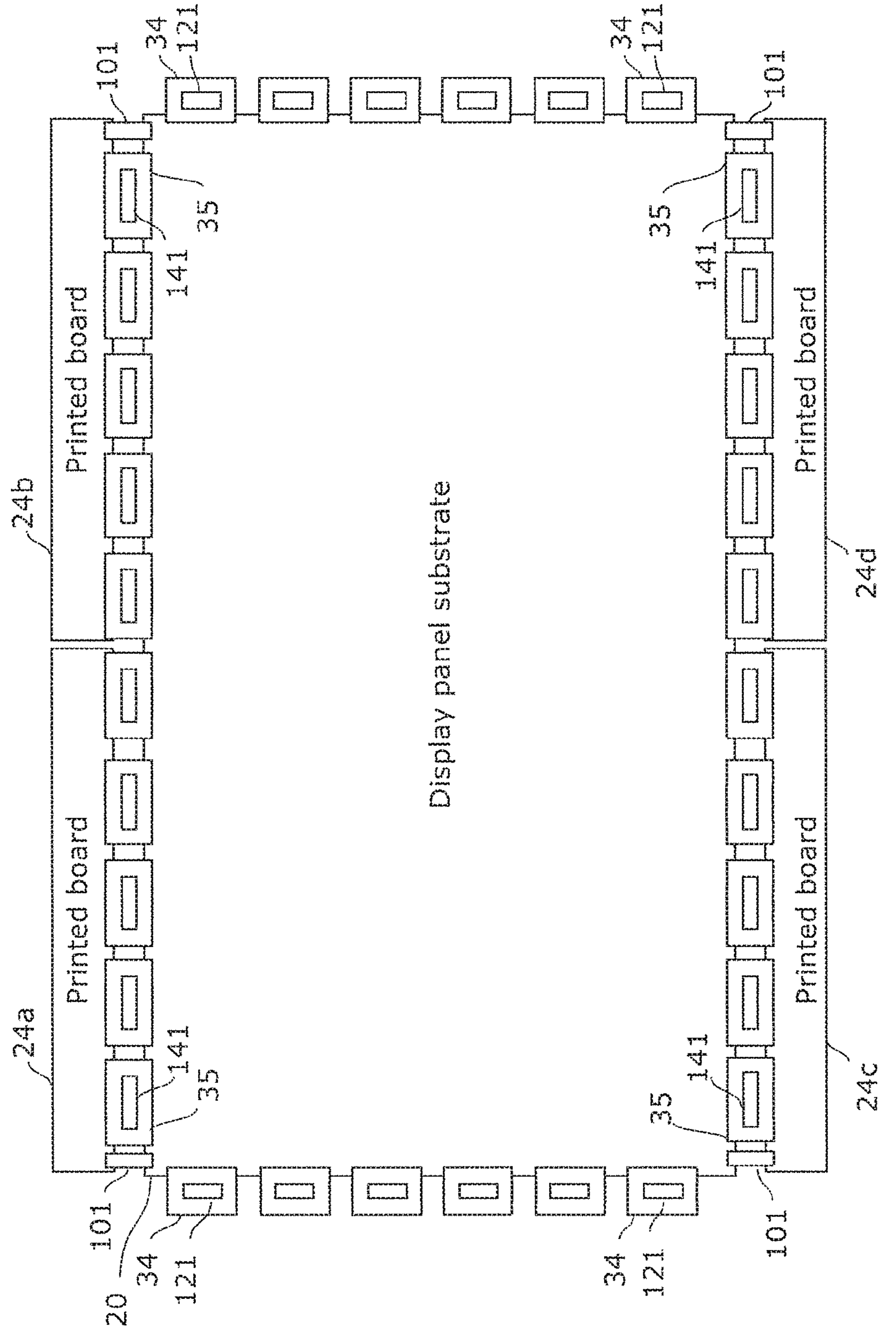
FIG. 3 is a diagram illustrating a substrate configuration example of the display apparatus according to Embodiment 1.

FIG. 3 is a block diagram illustrating an example of a substrate configuration of the display apparatus. In the diagram, the display apparatus 1 includes: a display panel substrate 20; a plurality of film substrates 34; a plurality of film substrates 35; printed boards 24*a* to 24*d*, and four voltage/signal supply units 101.

Film substrates 34 connected to the left side of the display panel substrate 20 among the plurality of film substrates 34 make up the gate driver circuit 12*a* in FIG. 2. The film substrates 34 which make up the gate driver circuit 12*a* are examples of a PCB-less configuration without connection to the printed circuit board (PCB) that is a printed board. Various kinds of power supply voltages and various kinds of control signals to the film substrates 34 are supplied from the control unit 33, via power supply lines and signal lines passing through either the printed board 24*a* or 24*b*, the voltage/signal supply unit 101, and the display panel substrate 20.

Film substrates 34 connected to the right side of the display panel substrate 20 among the plurality of film substrates 34 make up the gate driver circuit 12*h* in FIG. 2. The gate driver circuit 12*b* also has a PCB-less configuration.

Film substrates 35 connected to the upper side of the display panel substrate 20 among the plurality of film substrates 35 make up the source driver circuit 14 in FIG. 2. The film substrates 35 which make up the source driver circuit 14 are also connected to printed circuit boards (PCB) that are the printed boards 24*a* and 24*b*. Power supply lines and signal lines are connected to the film substrates 35 via the printed boards 24*a* and 24*b*. This is not a PCB-less configuration.

Film substrates 35 connected to the lower side of the display panel substrate 20 among the plurality of film substrates 35 make up a source driver circuit when the source driver circuit is provided at the lower side of the display panel substrate 20 although the source driver circuit is not illustrated in FIG. 2.

The printed boards 24*a* to 24*d* include the control unit 33 and the panel power supply unit 32 in FIG. 2.

The voltage/signal supply unit 101 is a film-shaped substrate, and supplies various kinds of power supply voltages and various kinds of control signals from one of the printed boards 24*a* to 24*d* to a closest film substrate 34 via the display panel substrate 20. More specifically, the voltage/signal supply unit 101 includes: power supply lines for supplying various kinds of voltages generated by the panel power supply unit 32 as power supply voltages to the closest film substrate 34 via the display panel substrate 20; and a signal line which supplies various kinds of control signals generated by the control unit 33 to the closest film substrate 34.

It is to be noted that the power supply lines are supplied from both of voltage/signal supply units 101 arranged at the upper and lower sides of the display panel substrate 20 to the display panel substrate 20. The control signals are not always supplied from the both, and a control signal is supplied from one of the voltage/signal supply units 101 arranged at the upper and lower sides, depending on the kind of the control signal.

The voltage/signal supply units 101 is not required unless the gate driver circuits 12*a* and 12*b* have a PCB-less configuration. In the case of a non-PCB-less configuration, various kinds of power supply lines and various kinds of signal lines are supplied from the PCB to the film substrate 34.

The substrate configuration of the display apparatus 1 has been described above.

[1-4. Configurations of COF Substrate and Gate Driver IC]

Next, descriptions are given of the configurations of the film substrate 34 and the gate driver IC 121, and connection of power supply lines.

Figure 4:
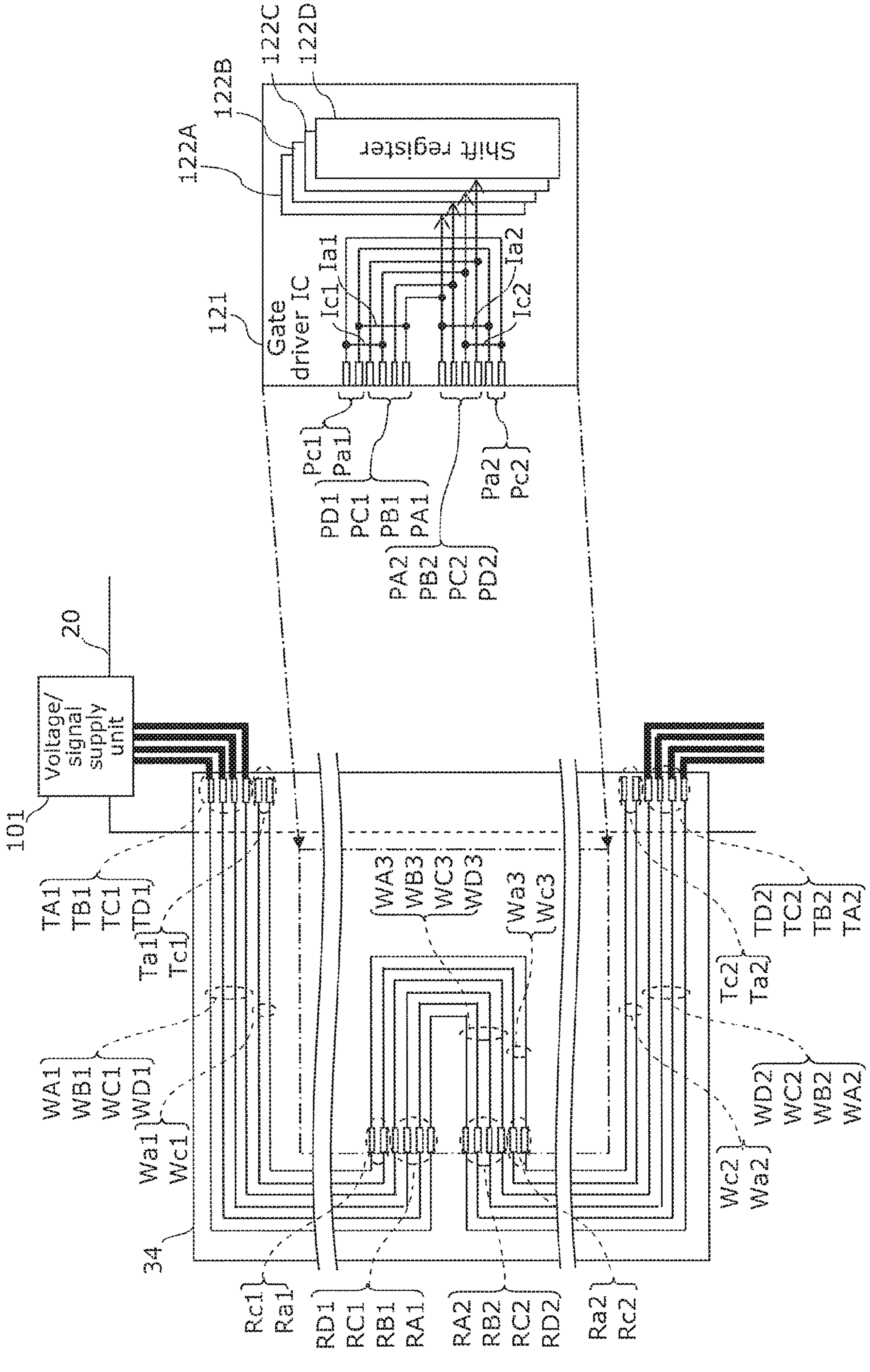
FIG. 4 is a diagram illustrating a configuration example of a COF substrate and a gate driver IC according to Embodiment 1.

FIG. 4 is a diagram illustrating a configuration example of a film substrate 34 that is the COF substrate and the gate driver IC 121 according to Embodiment 1. In the diagram, the gate driver IC 121 includes: N shift registers 122A to 122D (N=4 in this embodiment); power supply terminals PA1 to PD1, Pa1, Pc1; power supply terminals PA2 to PD2, Pa2, Pc2; and internal lines Ia1, Ic1, Ia2, Ic2, etc. To simplify the descriptions below, it is to be noted that terminals other than the power supply terminal of the gate driver IC 121 and lines other than the internal lines of the power supply are not illustrated in the diagram.

(N+k) power supply terminals PA1 to PD1, Pa1, and Pd1 among these are referred to as a first power supply terminal group, In addition, (N+k) power supply terminals PA2 to PD2, P32, and Pc2 are referred to as a second power supply terminal group.

The N shift registers 122A to 122D generate various kinds of gate signals to be supplied to the display panel substrate 20. The number of shift registers 122A to 122D is four assuming that four kinds of gate signals are supplied respectively to four switch transistors (that are an enable switch 23, a scan switch 24, an REF switch 26, and an INI switch 27) in pixel circuits 16. Voltages to be supplied to either the drains and the four switch transistors in the pixel circuits 16 vary in many cases, and thus voltages to be applied to the gates should correspond thereto. The respective shift registers 122A to 122D output gate signals for switching ON or OFF corresponding ones of the switch transistors. Thus, in order to enable supply of power supply voltages to the respective shift registers 122A to 122D, power supply terminals PA to PD are provided respectively therefor. In other words, the power supply terminals PA1 to PD1 are connected, one-to-one, to the shift registers 922A to 922D, and configured to be able to supply different power supply voltages.

Furthermore, k power supply terminals Pa1, Pc1 (k=2 in this embodiment) are provided as redundant power supply terminals. This is to increase flexibility in designing the power supply lines which connect the display panel substrate 20 and the film substrate 34.

The first power supply terminal group has six (that is (N+k)) power supply terminals PA1 to PD1, Pa1, and Pc1 which receive supply of power supply voltages from outside (from the film substrate 34 in FIG. 4. The six (that is (N+k)) power supply terminals PA1 to PD1, Pa1, and Pc1 are connected to six (that is (N+k)) internal lines. Four (that is N) internal lines connected to the power supply terminals PA1 to PD1 are connected, one-to-one, to four (that is N) shift registers 122A to 122D, and supply power supply voltages. In addition, the internal lines Ia1 and Id1 of two (that is k) internal lines connected to the power supply terminals Pa1 and Pc1 connect the respective k internal lines selected from the four (that is N) internal lines connected to the power supply terminals PA1 to PD1. The selected k internal lines are two internal lines connected to the power supply terminals PA1 and PC1 in FIG. 4.

In this way, the k power supply terminals Pa1 and Pc1 provided redundantly are connected to the power supply terminals PA1 and PC1 by the internal lines Ia1 and Ic1. In this way, a power supply voltage supplied to the power supply terminal Pa1 is equivalent to a power supply voltage supplied to the power supply terminal PA1. In other words, the power supply voltage can be supplied to the shift register 122A from any of the power supply terminal Pa1 and the power supply terminal PA1. Likewise, the power supply voltage can be supplied to the shift register 122C from any of the power supply terminal Pc1 and the power supply terminal PC1.

The gate driver IC 121 has the redundant k power supply terminals, which increases the flexibility in designing the power supply lines.

In addition, the second power supply terminal group in FIG. 4 includes (N+k) power supply terminals PA2 to PD2, Pa2, and Pc2 which receive supply of power supply voltages from outside (from the film substrate 34 in FIG. 4). The power supply terminals PA2 to PD2, Pa2, and Pc2 of the second power supply terminal group are connected, one-to-one, to the power supply terminals PA1 to PD1, Pa1, and Pc1 of the first power supply terminal group by internal lines. Here, redundantly provided k power supply terminals Pa2 and Pc2 included in the second power supply terminal group are connected to the power supply terminals PA2 and PC2 by the internal lines Ia2 and Ic2 as illustrated in FIG. 4.

The second power supply terminal group is paired with the first power supply terminal group for the reasons below. First, when a plurality of gate driver ICs 121 and a plurality of film substrates 34 are required for a display panel substrate 20, there is a need to relay a power supply voltage to the gate driver IC 121 and the film substrate 34 adjacent to (below in FIG. 4) current ones. Second, it is assumed that the film substrate 34 has a single layer in which lines cannot be crossed.

Next, the film substrate in FIG. 4 is described.

The film substrate 34 includes: power supply input terminals TA1 to TD1, Ta1, and Tc1; power supply output terminals TA2 to TD2, Ta2, and Tc2; pads RA1 to RD1, Ra1, Rc1, RA2 to RD2, Ra2, and Rc2; power supply output terminals TA2 to TD2, Ta2, and Tc2; first power supply lines WA1 to WD1, Wa1, and Wc1; second power supply lines WA2 to WD2, Wa2, and Wc2; and third power supply lines WA3 to WD3, Wa3, and Wc3.

Among these, (N+k) power supply input terminals TA1 to TD1, Ta1, and Tc1 are referred to as a power supply input terminal group. (N+k) power supply output terminals TA2 to TD2, Ta2, and Tc2 are referred to as a power supply output terminal group. (N+k) pads RA1 to RD1, Ra1, and Rd1 are referred to as a first pad group, (N+k) pads RA2 to RD2, Ra2, and Rc2 are referred to as a second pad group. (N+k) power supply output terminals TA2 to TD2, Ta2, and Tc2 are referred to as a power supply output terminal group. First power supply lines WA1 to WD1, Wa1, and Wc1 are referred to as a first power supply terminal group. Second power supply lines WA2 to WD2, Wa2, and Wc2 are referred to as a second power supply group. Third power supply lines WA3 to WD3, Wa3, and Wc3 are referred to as a third power supply group. It is to be noted that signal lines (for example, clock signals, control signals, etc.) other than the power supply lines are not illustrated in FIG. 4 to simplify the descriptions below.

The power supply input terminal group has (N+k) power supply input terminals TA1 to TD1, Ta1, and Tc1. In this embodiment, N=4 and k=2 are satisfied. N power supply input terminals correspond to power supply voltages of N shift registers. Here, k power supply input terminals are power supply input terminals provided redundantly in order to increase the flexibility in designing the power supply lines of the display panel substrate 20. Each of the power supply input terminals is a pad formed on the film substrate 34, connected using an ACF with the pad of the display panel substrate 20, and capable of receiving supply of a power supply voltage from the power supply line of the display panel substrate 20.

The first pad group has (N+k) pads RA1 to RD1, Ra1, and Rd1 formed on the film substrate 34, and are connected to the power supply terminals PA1 to PD1, Pa1, and Pc1 of the gate driver IC 121.

The second pad group has (N+k) pads RA2 to RD2, Ra2, and Rc2 formed on the film substrate 34, and are connected to the power supply terminals PA2 to PD2, Pa2, and Pc2 of the gate driver IC 121.

The first power supply lines WA1 to WD1, Wa1, and WC1 of the first power supply line group connect, one-to-one, the power supply input terminals Th1 to TD1, Ta1, and Tc1 of the power supply input terminal group and the pads RA1 to RD1, Ra1, and Rc1 of the first pad group.

The second power supply lines WA2 to WD2, Wa2, and Wc2 of the second power supply line group connect, one-to-one, the pads RA2 to RD2, Ra2, and Rc2 of the second pad group and the power supply output terminals TA2 to TD2, Ta2, and Tc2 of the power supply output terminal group.

The third power supply lines WA3 to WD3, Wa3, and Wc3 connect, one-to-one, the pads RA1 to RD1, Ra1, and Rc1 of the first pad group and the pads RA2 to RD2, Ra2, and Rc2 of the second pad group.

The power supply lines in each of the first to third power supply line groups is wired to surround the panel because the wiring layer of the film substrate 34 is a single layer. In addition, each of the first to third power supply line groups supplies a power supply voltage to the gate driver IC 121, and a power supply voltage to an adjacent film substrate 34.

As described above, the film substrate 34 includes: k power supply input terminals Ta1 and Tc1 provided redundantly, and k power supply output terminals Ta2 and Tc2. In this way, the power supply voltage supplied to the power supply input terminal Ta1 is equivalent to the power supply voltage supplied to the power supply input terminal TA1. In other words, the power supply voltage can be supplied to the shift register 122A from any of the power supply input terminal Ta1 and the power supply input terminal TA1. Likewise, the power supply voltage can be supplied to the shift register 122C from any of the power supply input terminal Tc1 and the power supply input terminal TC1. In this way, it is possible to increase the flexibility in designing the power supply lines in the display panel substrate 20.

Furthermore, the power supply voltage output from the power supply output terminal Ta2 is equivalent to the power supply voltage output from the power supply output terminal TA2. Likewise, the power supply voltage output from the power supply output terminal Tc2 is equivalent to the power supply voltage output from the power supply output terminal TC2. In this way, it is possible to provide the same flexibility in designing the power supply lines in power supply output terminal, as in the power supply input terminal.

[1-5. Example of Power Supply Lines]

Subsequently, a combination that allows to share a power supply voltage in the shift registers 122A to 122D is described taking a specific example.

First, a description is given of an example in which the number of power supply voltages to be supplied to the shift registers 122A to 122D is reduced to two according to this embodiment.

FIG. 5 is a diagram illustrating a combination of a shift register to which a power supply voltage V1 is supplied and a shift register to which a power supply voltage V2 is supplied in the case where the number of power supply voltages is reduced to two according to this embodiment. It is assumed that the voltage/signal supply unit 101 supplies two different power supply voltages V1 and V2. In the diagram, "A" corresponds to a power supply system for the shift register 122A, the power supply input terminals TA1 and TA2, the pads RA1 and RA2, the power supply terminals PA1 and PA2, and the lines WA1, WA2, and WA3. A similar correspondence is found for each of "B" to "D" in the diagram.

As illustrated in FIG. 5, there are seven patterns (a) to (g) as combinations of shift registers to which the power supply voltage V1 is supplied and shift registers to which the power supply voltage V2 is supplied.

Figure 6:
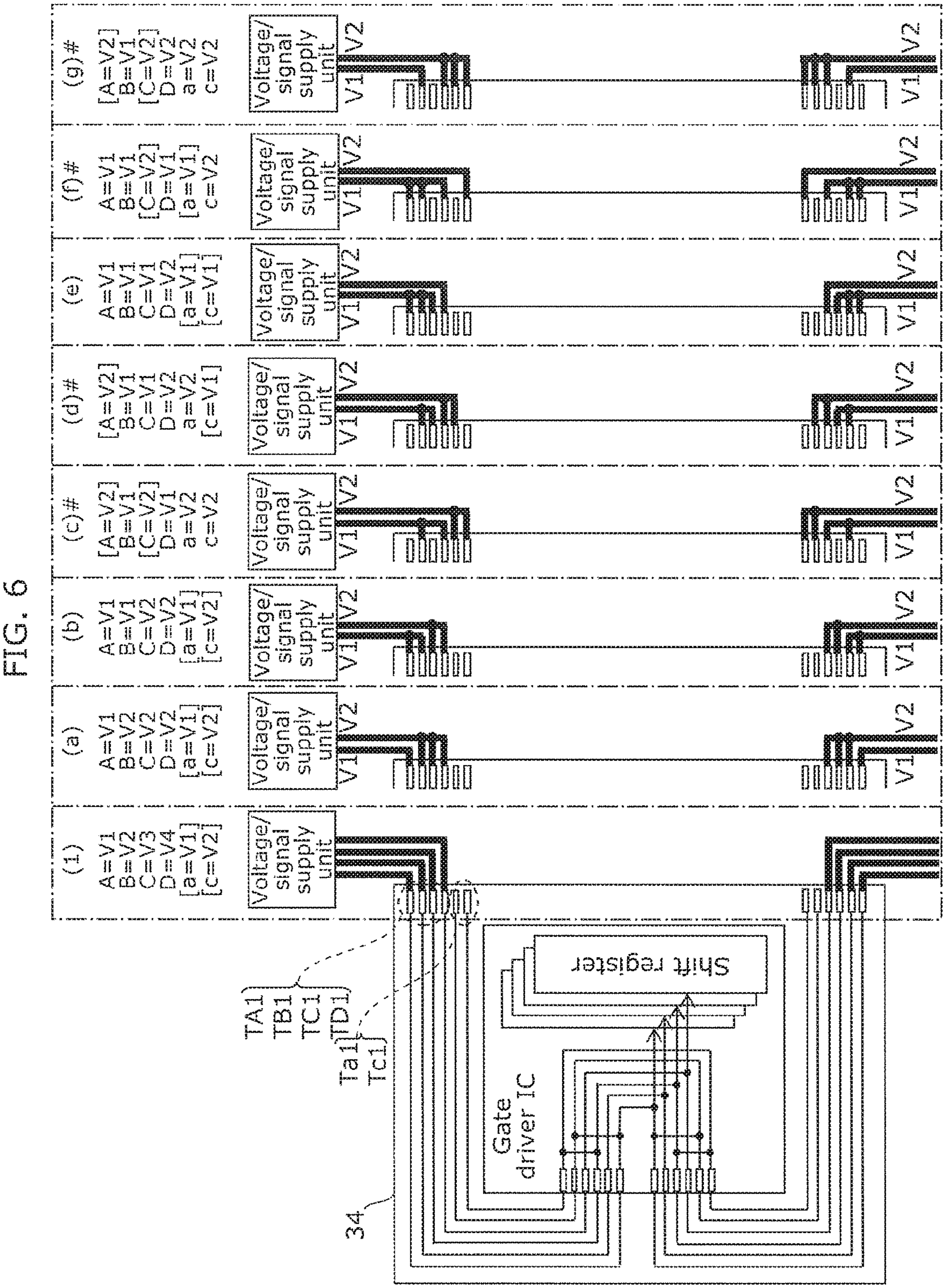
FIG. 6 is a diagram illustrating a connection example of power supply lines respectively corresponding to combinations in FIG. 5 according to Embodiment 1.

FIG. 6 is a diagram illustrating a connection example of power supply lines respectively corresponding to the combinations in FIG. 5. "A" to "D" in FIG. 6 has the same meaning as in FIG. 5. In FIG. 6, "a" corresponds to a power supply system for the power supply input terminals Ta1 and Ta2 provided redundantly, the pads Ra1 and Ra2, the power supply terminals Pa1 and Pa2, and the lines Wa1, Wa2, and Wa3. A similar correspondence is found for "c" in the diagram.

In addition, the notation "A=V1" in FIG. 6 means that the power supply line of the power supply voltage V1 on the display panel substrate 20 is connected to the power supply input terminal TA1, and that the power supply line corresponding to the power supply voltage V1 for cascade connection on the display panel substrate 20 is connected to the power supply output terminal TA2. It is to be noted that each notation with brackets means that the power supply input terminal is not connected to any of the power supply lines in the display panel substrate 20. For example, the notation [A=V2] means that the power supply input terminal TA1 and the power supply output terminal TA2 are not connected, and that the power supply input terminal Ta1 of a and the power supply line of the display panel substrate 20 are connected, so as to substantially supply a power supply voltage V2 thereto.

In FIG. 6, (1) illustrates an example in which no power supply voltage is shared. In other words, (1) in FIG. 6 illustrates an example in which four kinds of power supply voltages V1 to V4 are supplied from the voltage/signal supply unit 101, and the power supply voltages V1 to V4 are supplied, one-to-one, to A to D (shift registers 122A to 122D). In this case, the power supply voltage supplied to the shift registers 122A to 122D is equivalent to the one in FIG. 1A.

Here, (a) to (g) in FIG. 6 correspond to (a) to (g) in FIG. 5. For example, in (a) in FIG. 6, the power supply input terminal TA1 is connected to the power supply line of the power supply voltage V1 on the display panel substrate 20, the power supply input terminals TB1 to TD1 are connected, one-to-one, to the power supply lines of the power supply voltage V2 on the display panel substrate 20. The power supply input terminals Ta1 and Tc1 are not connected.

In each of the connection examples (a), (b), and (e) in FIG. 6, the redundant power supply input terminals Ta1 and Tc1 are not connected. Thus, this connection is possible also in FIG. 1A. In addition, in each of (c), (d), (f), and (g) assigned with "#" in FIGS. 5 and 6, the use of either the redundant power supply input terminals Ta1 or Tc1 is required to establish a connection. In other words, the connection example assigned with "#" can be established only when the redundant power supply input terminals are provided.

In this way, in the conventional FIG. 1A, three connection patterns (a), (b), and (e) are possible. On the other hand, in the connection example of FIG. 6, seven connection patterns of (a) to (g) are possible. The flexibility in designing power supply lines in the case where the number of power supply voltages is reduced to two according to Embodiment 1 is increased from three patterns to seven patterns.

Next, a description is given of an example in which the number of power supply voltages to be supplied to the shift registers 122A to 122D is reduced to three according to this embodiment.

FIG. 7 is a diagram illustrating a combination of shift registers to which power supply voltages V1, V2 and V3 are supplied in the case where the number of power supply voltages is reduced to three according to this embodiment. It is assumed that the voltage/signal supply unit 101 supplies three different power supply voltages V1, V2, and V3. In addition, a similar correspondence is found for "A" to "D" in the diagram.

As illustrated in FIG. 7, the combinations of shift registers to which the power supply voltages V1, V2, and V3 are supplied are six patterns (a) to (f).

Figure 8:
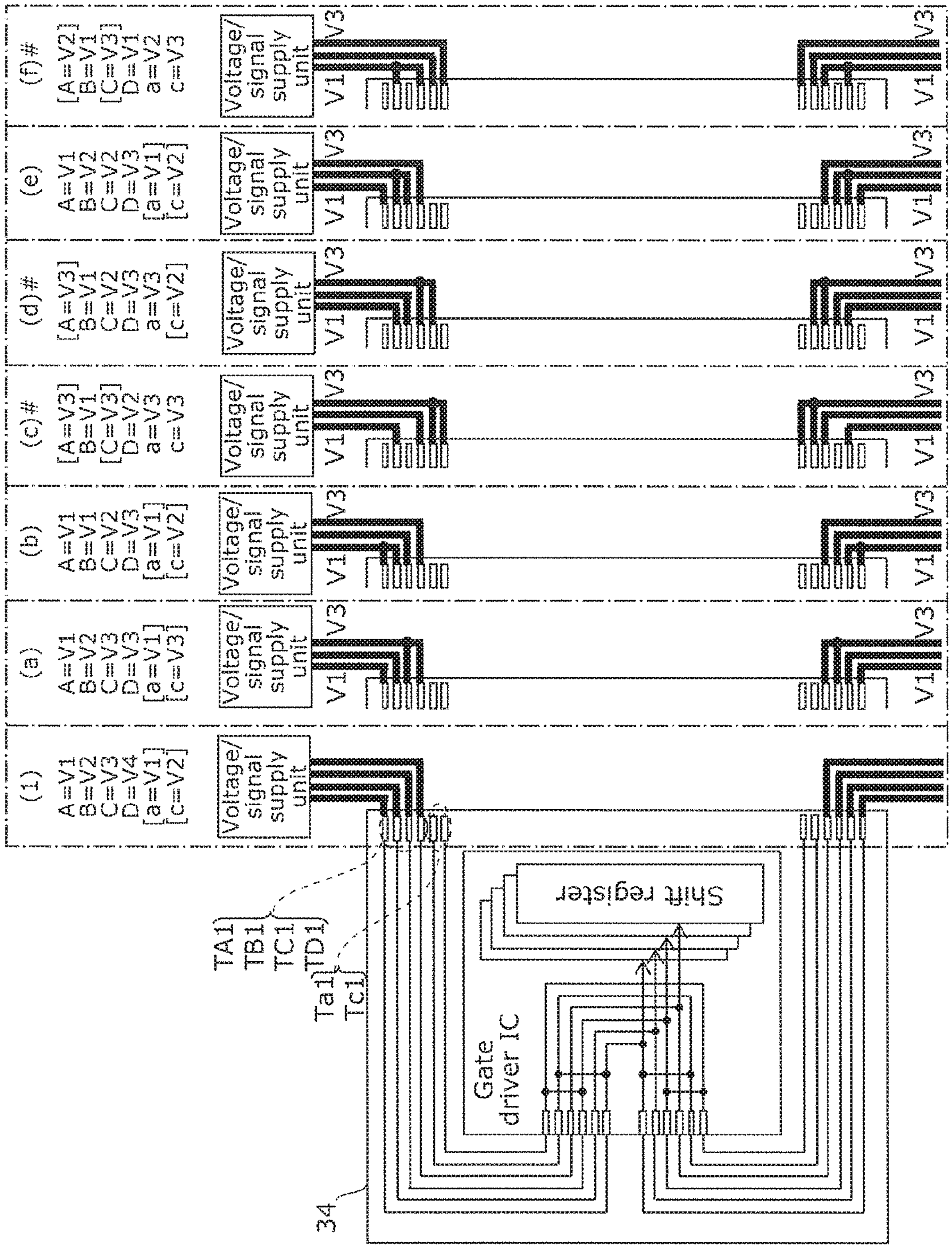
FIG. 8 is a diagram illustrating a connection example of power supply lines respectively corresponding to combinations in FIG. 7 according to Embodiment 1.

FIG. 8 is a diagram illustrating a connection example of power supply lines respectively corresponding to the combinations in FIG. 7. It is to be noted that, in FIG. 8, (1) illustrates an example in which no power supply voltage is shared. As illustrated in (a) to (f) of FIG. 8, the flexibility in designing power supply lines is increased as indicated below. In the conventional FIG. 1A, three connection patterns (a), (b), and (e) are possible. On the other hand, in the connection example of FIG. 8, six connection patterns of (a) to (f) are possible. The flexibility in designing power supply lines in the case where the number of power supply voltages is reduced to three according to Embodiment 1 is increased from three patterns to six patterns.

As described above, the gate driver IC in this embodiment includes redundant k power supply terminals, and k internal lines therein connect, one-to-one, the k power supply terminals and the k internal lines selected from among n internal lines. Thus, a power supply voltage can be shared between power supply terminals which are not adjacent to each other among the n power supply terminals. In other words, it is possible to design the gate driver IC, the COF substrate, and the display apparatus to have a reduced or not reduced number of power supply voltages to be supplied thereto, that is, the number of power supply lines on the display panel substrate. Therefore, the flexibility in designing the power supply lines is high, and thus it is possible to increase versatility.

It is to be noted that, in this embodiment, a power supply system "a" including the power supply input terminal Ta1 and a power supply system "c" including the power supply input terminal Tc1 are redundantly provided as a non-limiting example. For example, power supply systems "b" and "d" may be provided at a power supply input terminal Ta1 side, in replacement for the power supply systems "a" and "c". In this case, the gate driver IC 121 may include: an internal line Ib1 which connects a power supply terminal PB1 and a power supply terminal Pb1; an internal line Ib2 which connects a power supply terminal PB2 and a power supply terminal Pb2; an internal line Id1 which connects a power supply terminal PD1 and a power supply terminal Pd1; and an internal line Id2 which connects a power supply terminal PD2 and a power supply terminal Pd2.

In addition, the number k of redundant power supply systems is not limited to two. For example, even if k is 1, it is possible to increase the flexibility in designing the connection of the power supply lines.

Embodiment 2

In this embodiment, detailed descriptions are given of a display apparatus, a gate driver IC, a COF substrate in the case where a combination of N and k (N, k) is (3, 1).

Figure 9:
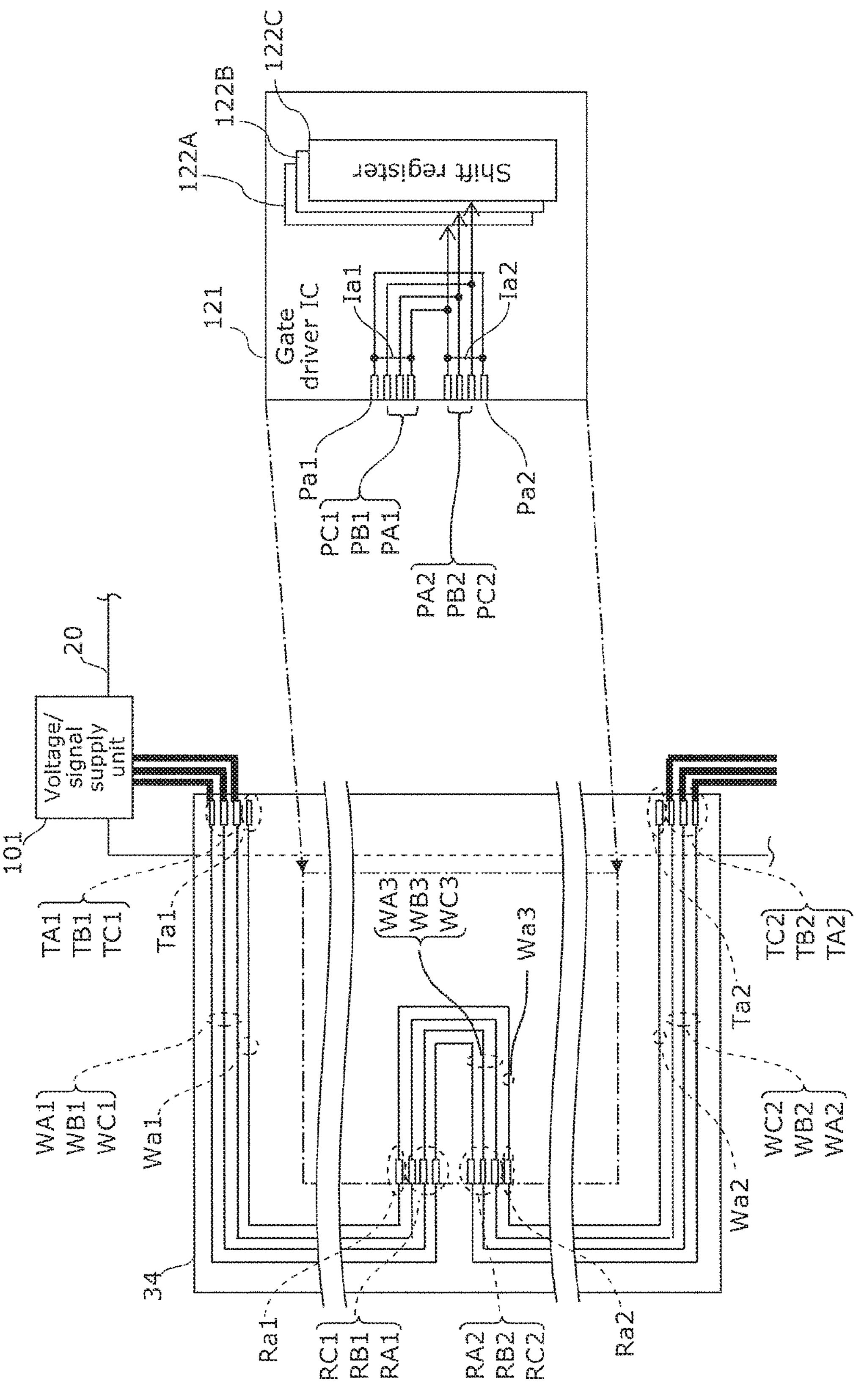
FIG. 9 is a diagram illustrating a configuration example of a COF substrate and a gate driver IC according to Embodiment 2.

FIG. 9 is a diagram illustrating a configuration example of a COF substrate and a gate driver IC according to Embodiment 2. Compared with the configuration in FIG. 4, the configuration in FIG. 9 is different in that: a system "D" including the shift register 122D, the power supply terminals PD1 and PD2, the power supply input terminal IA1, the pads RD1 and RD2, the power supply output terminal TD2, and the power supply lines WD1, WD2, and WD3 are not provided; a system "c" including the power supply terminals Pc1 and Pc2, the power supply input terminal Tc1, the pads Rc1 and Rc2, the power supply output terminal Tc2, and the power supply lines Wc1, Wc2, and Wc3 are not provided; and the internal lines Ic1 and Ic2 are not provided. This configuration is provided assuming that the number of switch transistors in each pixel circuit 16 is three. The redundantly provided system "a" in FIG. 9 increases the flexibility in designing the power supply lines.

Figures 10, 11:
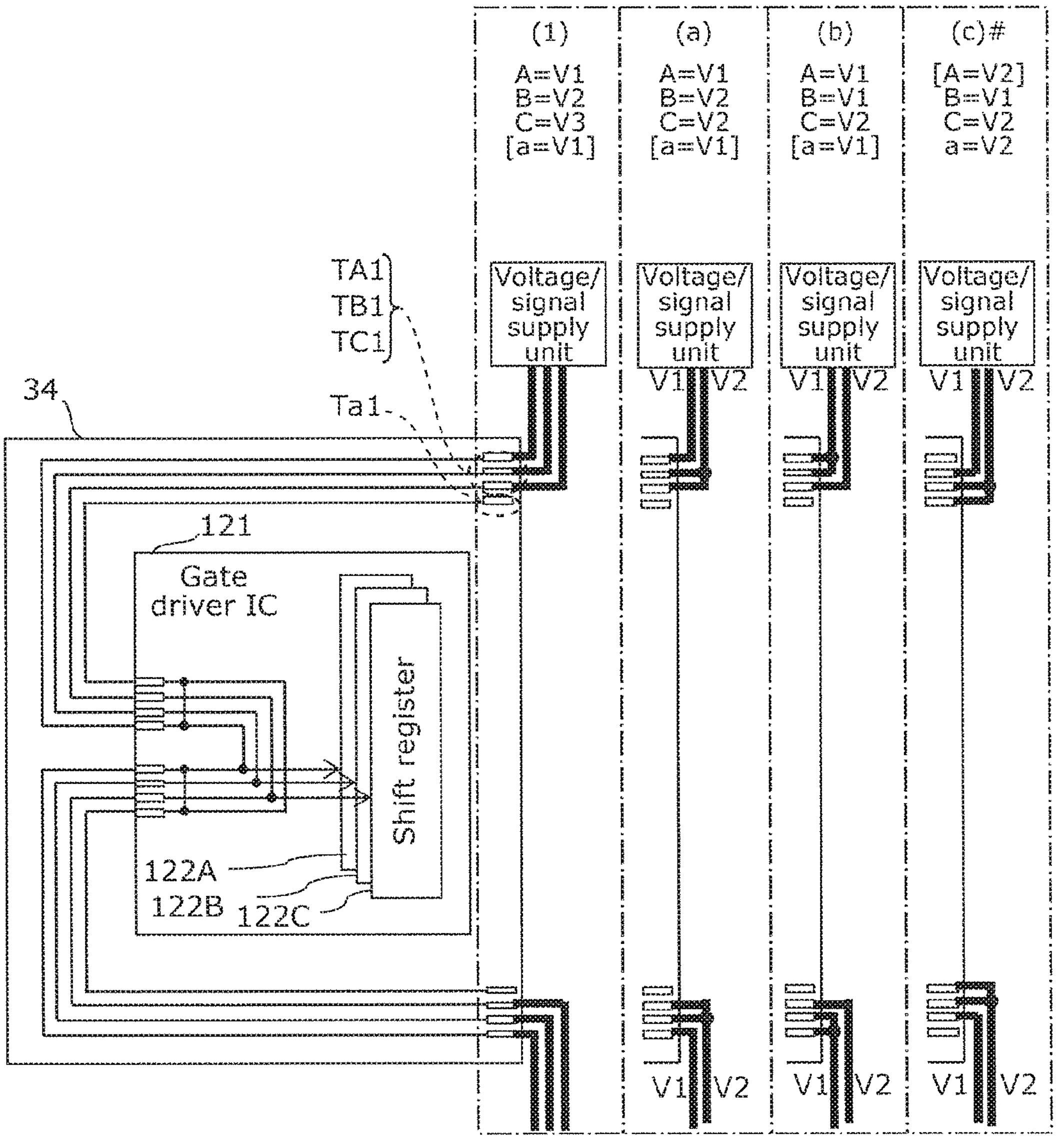
FIG. 10 is a diagram illustrating a combination of a shift register to which a power supply voltage V1 is supplied and a shift register to which a power supply voltage V2 is supplied in the case where the number of power supply voltages is reduced to two according to Embodiment 2.
FIG. 11 is a diagram illustrating a connection example of power supply lines respectively corresponding to combinations in FIG. 10 according to Embodiment 2.

FIG. 10 is a diagram illustrating combinations of shift registers to which a power supply voltage V1 is supplied and shift registers to which a power supply voltage V2 is supplied in the case where the number of power supply voltages to be supplied to the shift registers 122A to 122C is reduced to two. As illustrated in the diagram, the combinations of shift registers to which the power supply voltages V1 and V2 are supplied are three patterns (a) to (c).

FIG. 11 is a diagram illustrating a connection example of power supply lines respectively corresponding to the combinations in FIG. 10. However, it is to be noted that, in FIG. 11, (1) illustrates a connection example in which no power supply voltage is shared. The wiring examples (a) and (b) in the diagram are possible without the redundant power supply input terminal Ta1, but the wiring example of (c) assigned with "#" cannot be connected without the redundant power supply input terminal Ta1.

In this way, the flexibility in designing the power supply lines in the case where the number of power supply voltages is reduced to two according to this embodiment is increased from two patterns to three patterns.

It is to be noted that, in this embodiment, a power supply system "a" including the power supply input terminal Ta1 is redundantly provided as a non-limiting example. For example, a power supply systems "c" including the power supply input terminal Tc may be redundantly provided adjacent to the power supply input terminal TA1, in replacement for the power supply system "a".

Embodiment 3

In this embodiment, detailed descriptions are given of a display apparatus, a gate driver IC, a COF substrate in the case where a combination of N and k (N, k) is (5, 3).

Figure 12:
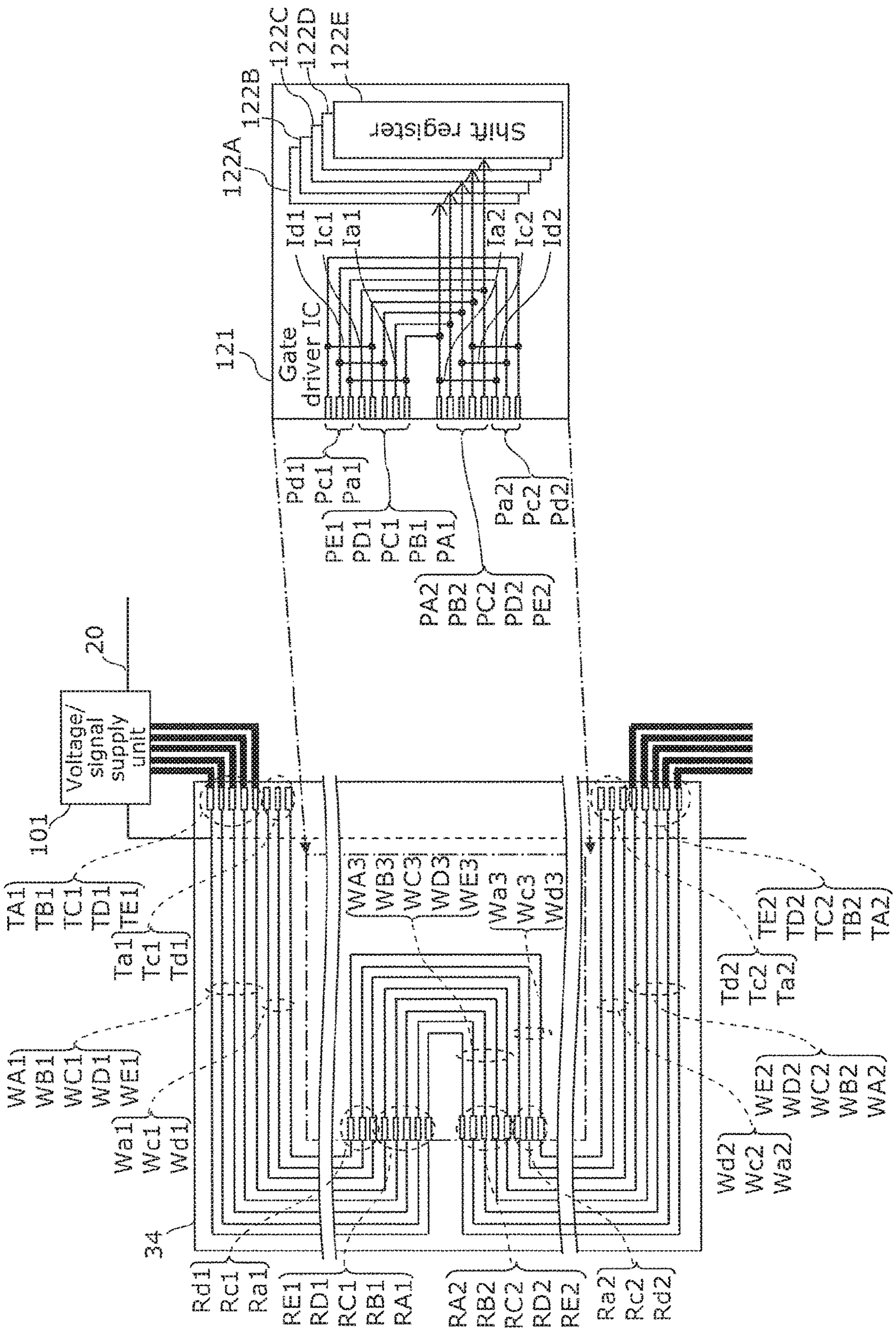
FIG. 12 is a diagram illustrating a configuration example COF substrate and a gate driver IC according to Embodiment 3.

FIG. 12 is a diagram illustrating a configuration example of a COF substrate and a gate driver IC according to Embodiment 3. Compared with the configuration in FIG. 4, the configuration in FIG. 12 is different in that systems "E" and "d" are added, and the internal lines Id1 and Id2 are added. This configuration is provided assuming that each pixel circuit 16 includes five switch transistors.

First, a description is given of an example in which the number of power supply voltages to be supplied to the shift registers 122A to 122E is reduced to two according to this embodiment.

FIG. 13 is a diagram illustrating a combination of a shift register to which a power supply voltage V1 is supplied and a shift register to which a power supply voltage V2 is supplied in the case where the number of power supply voltages is reduced to two according to this embodiment. It is assumed that the voltage/signal supply unit 101 supplies two different power supply voltages V1 and V2. As illustrated in the diagram, there are fifteen patterns (a) to (o) as combinations of shift registers to which the power supply voltage V1 is supplied and shift registers to which the power supply voltage V2 is supplied.

Figure 14A:
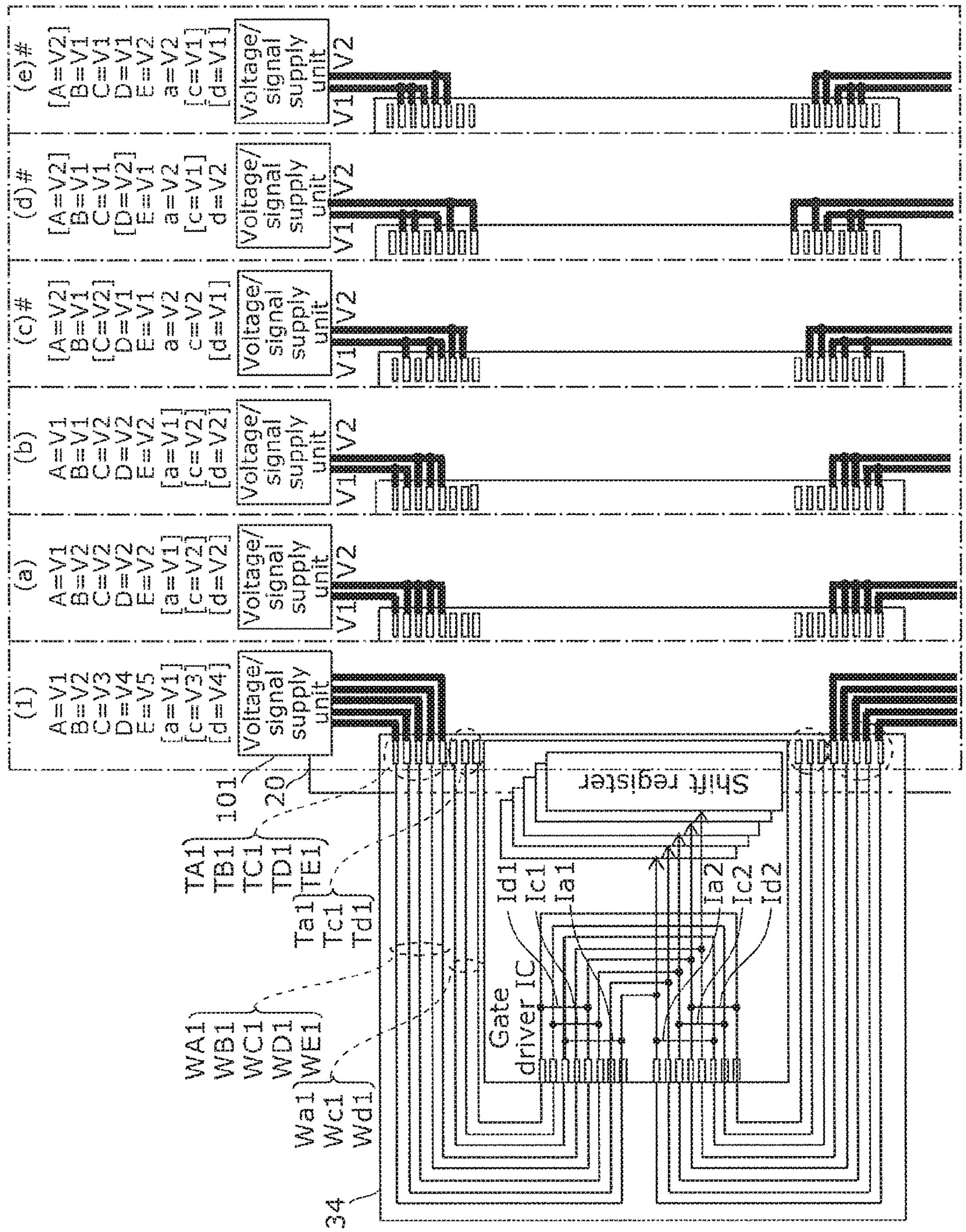
FIG. 14A is a diagram illustrating a connection example of power supply lines respectively corresponding to combinations in FIG. 13 according to Embodiment 3.
Figure 14B:
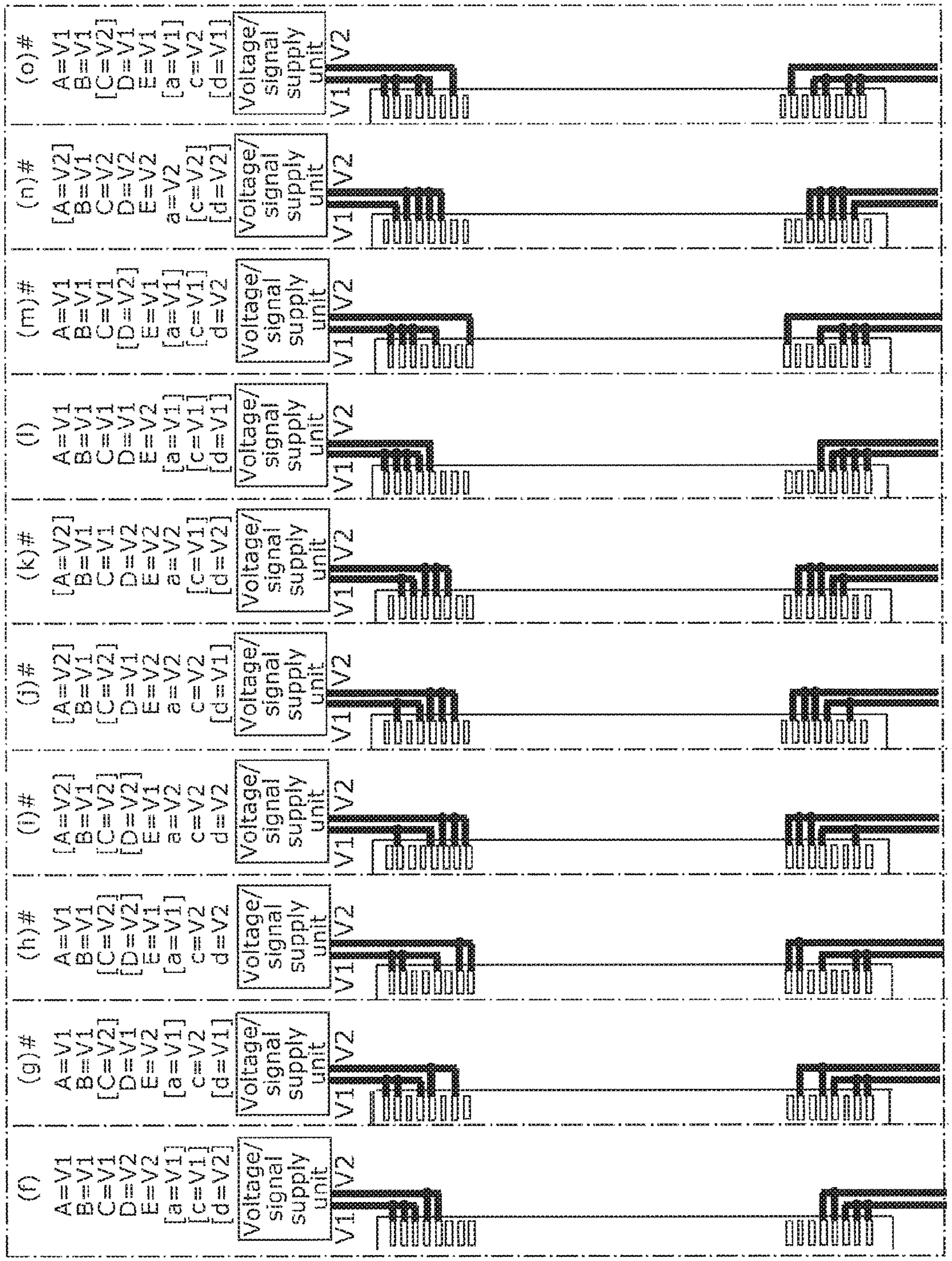
FIG. 14B is a diagram illustrating an example of wiring that follows the wiring in FIG. 14A according to Embodiment 3.

Each of FIGS. 14A and 14B is a diagram illustrating a connection example of power supply lines respectively corresponding to the combinations in FIG. 13. However, it is to be noted that, in FIG. 14, (1) illustrates a connection example in which no power supply voltage is shared. Each of FIG. 14A and FIG. 14B illustrates the connection example in which the number of power supply voltages is not reduced. In each of FIGS. 14A and 14B, wiring examples in which connection is possible without redundant power supply input terminals Ta1, Tc1, and Id1 are four patterns (a), (b), (f), and (i). On the other hand, wiring examples in which connection is impossible without redundant power supply input terminals Ta1, Tc1, and Td1 are eleven patterns (c) to (e), (g) to (k), and (m) to (o). In other words, the flexibility in designing power supply lines in the case where the number of power supply voltages is reduced to two according to Embodiment 2 is increased from four patterns to fifteen patterns.

Next, a description is given of an example in which the number of power supply voltages to be supplied to the shift registers 122A to 122E is reduced to three according to this embodiment.

FIG. 15 is a diagram illustrating a combination of shift registers to which power supply voltages V1, V2 and V3 are supplied in the case where the number of power supply voltages is reduced to three according to this embodiment. It is assumed that the voltage/signal supply unit 101 supplies three different power supply voltages V1, V2, and V3.

As illustrated in FIG. 15, combinations of shift registers to which power supply voltages V1, V2, and V3 are supplied are twenty-five patterns (a) to (y).

Figure 16A:
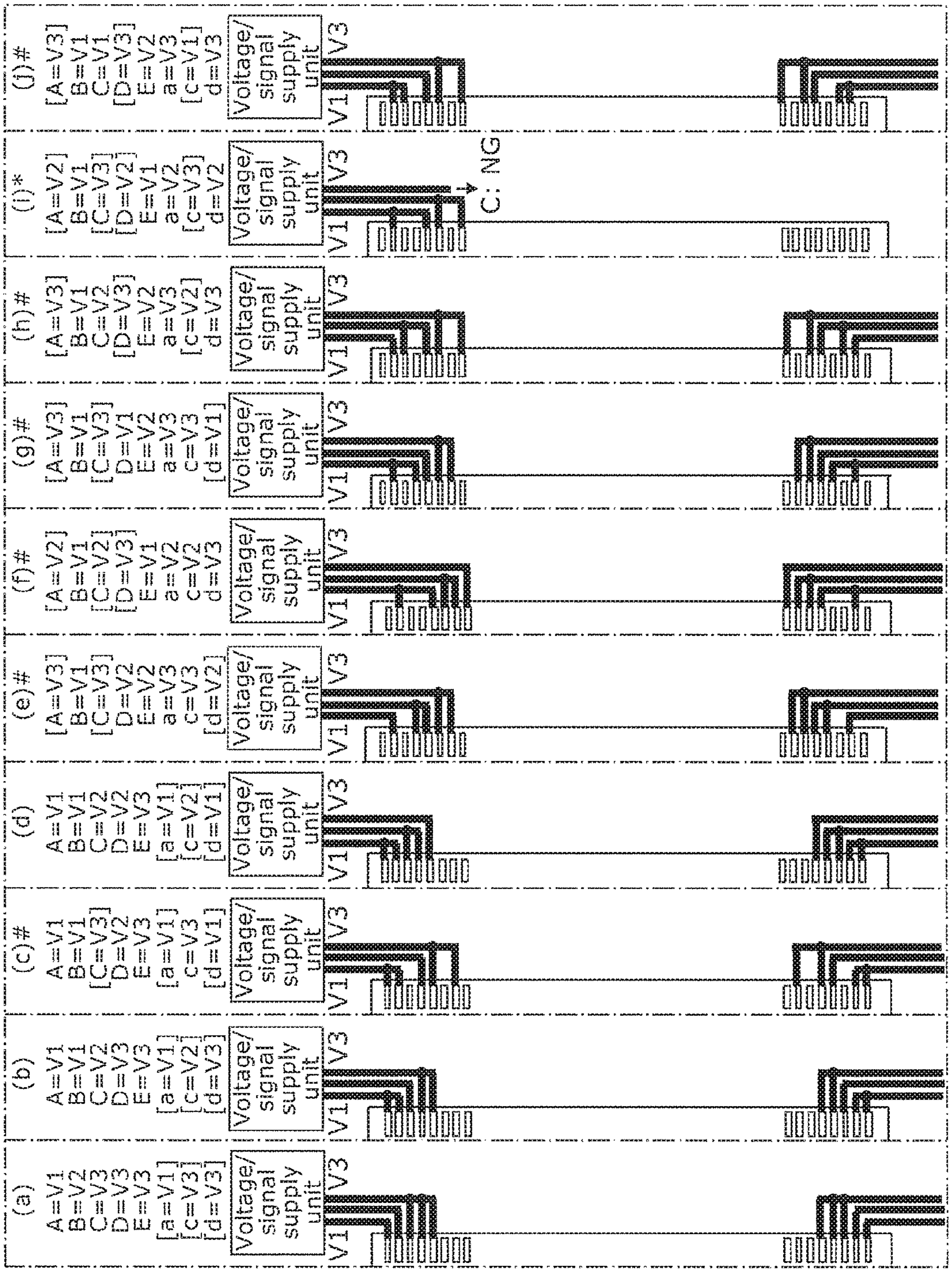
FIG. 16A is a diagram illustrating a connection example of power supply lines respectively corresponding to combinations in FIG. 15 according to Embodiment 3.
Figure 16B:
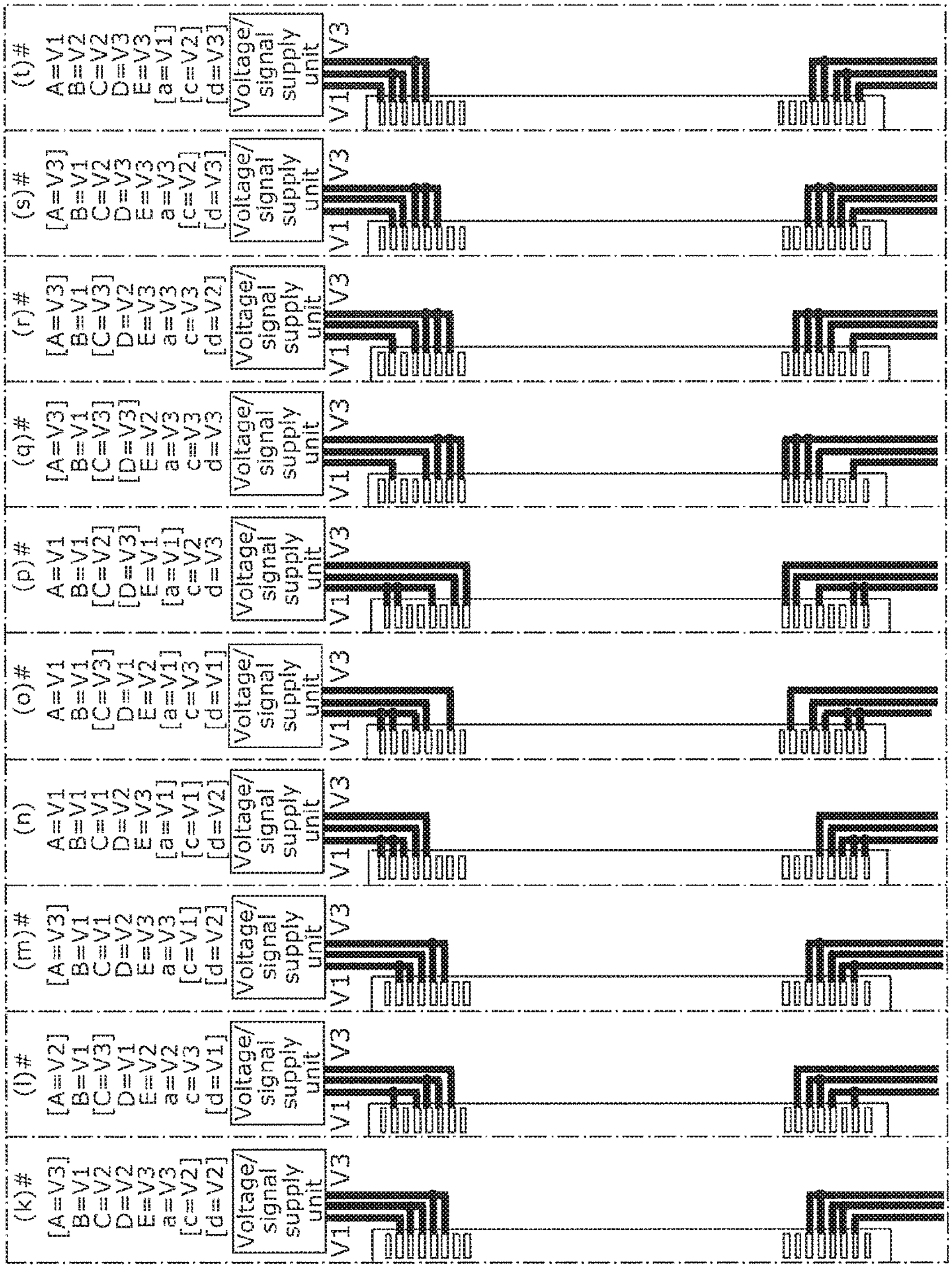
FIG. 16B is a diagram illustrating an example of wiring that follows the wiring in FIG. 16A according to Embodiment 3.
Figure 16C:
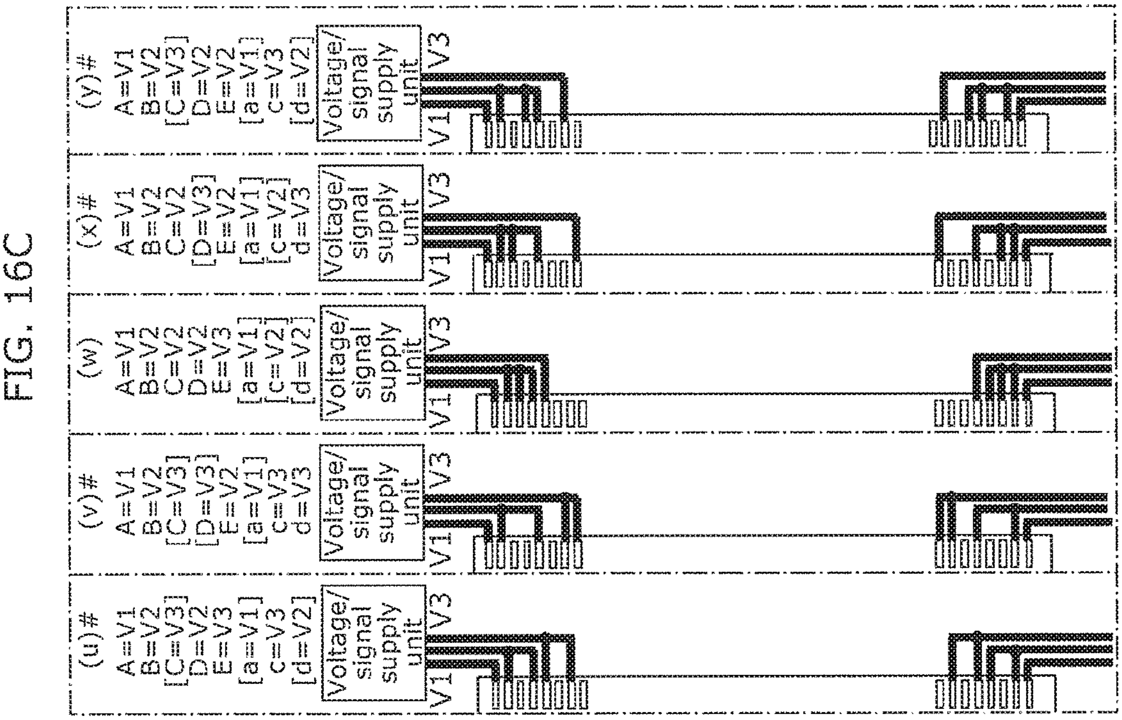
FIG. 16C is a diagram illustrating an example of wiring that follows the wiring in FIG. 16B according to Embodiment 3.

Each of FIGS. 16A, 16B, and 16C is a diagram illustrating a connection example of power supply lines respectively corresponding to the combinations in FIG. 15. The five wiring examples (a), (b), (d), (n), and (w) in these diagrams are possible without redundant power supply input terminals Ta1, Te1, and Td1, but nineteen wiring examples (c), (e) to (h), (j) to (m), (o) to (v), (x), and (y) each assigned with "#" cannot be connected without the redundant power supply input terminals Ta1, Tc1, and Td1. In addition, the combination (i) assigned with "*" cannot be connected in the configuration of FIG. 12.

In this way, the flexibility in designing power supply lines in the case where the number of power supply voltages is reduced to three according to this embodiment is increased from five patterns to twenty-four patterns.

Next, a description is given of an example in which the number of power supply voltages to be supplied to the shift registers 122A to 122E is reduced to four according to this embodiment.

FIG. 17 is a diagram illustrating a combination of shift registers to which power supply voltages V1 to V4 are supplied in the case where the number of power supply voltages is reduced to four according to this embodiment. It is assumed that the voltage/signal supply unit 101 supplies four different power supply voltages V1 to V4.

As illustrated in FIG. 17, combinations of shift registers to which power supply voltages V1 to V4 are ten patterns (a) to (j).

Figure 18:
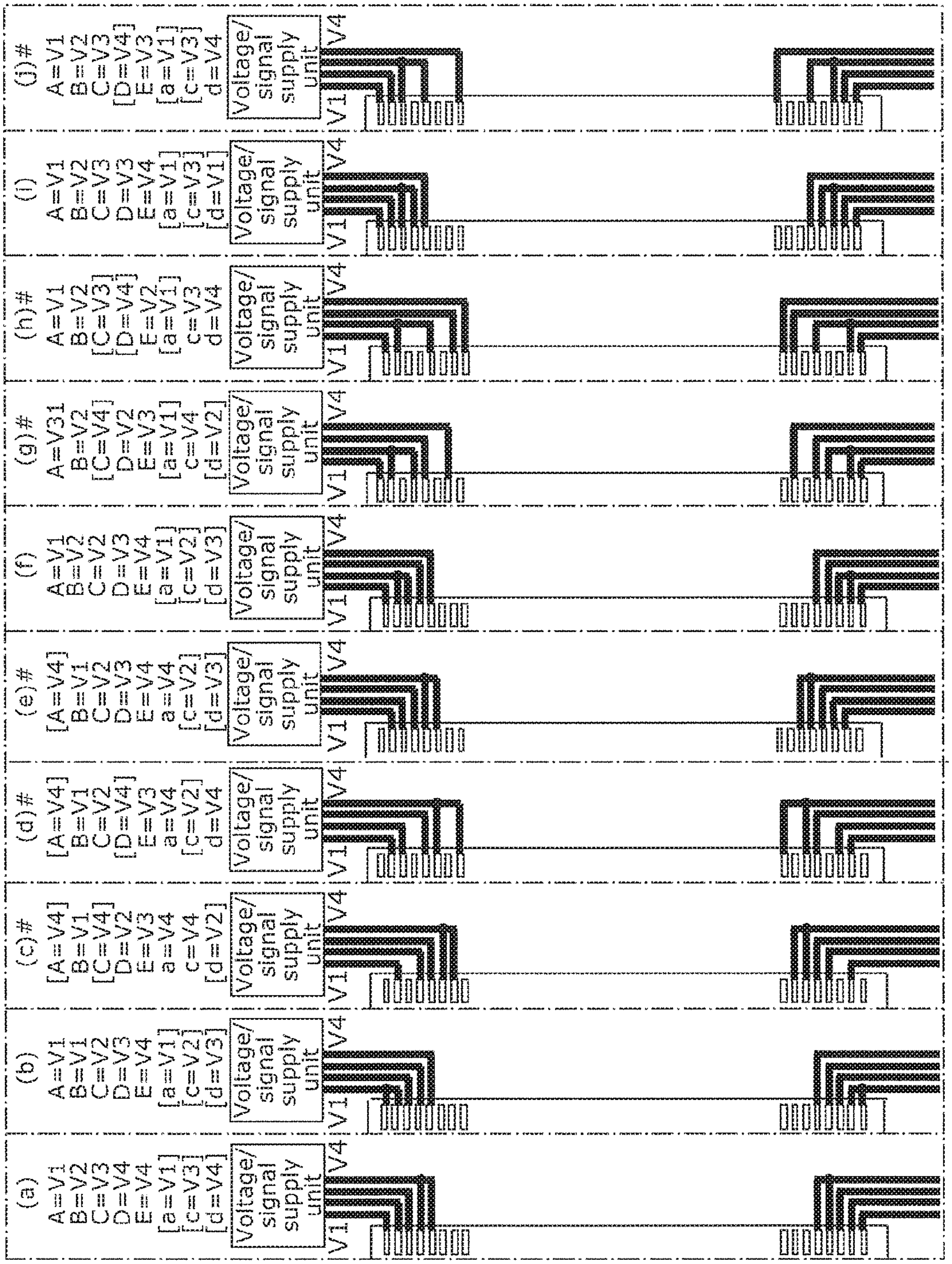
FIG. 18 is a diagram illustrating a connection example of power supply lines respectively corresponding to combinations in FIG. 17 according to Embodiment 3.

FIG. 18 is a diagram illustrating a connection example off power supply lines respectively corresponding to the combinations in FIG. 17. The four connection examples (a), (b), (f), and (i) in the diagram are possible without redundant power supply input terminals Ta1, Te1, and Td1, but the six wiring examples (c) to (e), (g), and (h) assigned with "#" cannot be connected without the redundant power supply input terminals Ta1, Tc1, and Td1.

In this way, the flexibility in designing the power supply lines in the case where the number of power supply voltages is reduced to four according to this embodiment is increased from four patterns to ten patterns.

It is to be noted that, in this embodiment, a power supply system "a" including the power supply input terminal Ta1, a power supply system "c" including the power supply input terminal Tc1, and a power supply system "d" including the power supply input terminal Td1 are redundantly provided as a non-limiting example. The number k of the redundant power supply systems is not limited to three, and may be one, four, or any other number. In addition, each of the redundant power supply systems may be connected to one of non-redundant power supply systems (that are a power supply system selected from among the power supply systems ("A" to "D") by an internal line inside the gate driver IC 121.

Next, a variation of Embodiment 3 is described with reference to the drawings. In the configuration example of the COF substrate and the gate driver IC illustrated in FIG. 12 in Embodiment 3, an example in which three power supply systems "a", "c", and "d" are redundantly provided is described. In other words, the example in which the redundant power supply systems "a", "c", and "d" are added to the originally present five power supply systems "A" to "E". In this configuration example, there is a case where connection is impossible in the case (i) assigned with "*" in FIG. 16A. In the variation of Embodiment 3, a configuration example in which connection is possible even in the case (i) in FIG. 16A.

Figure 19:
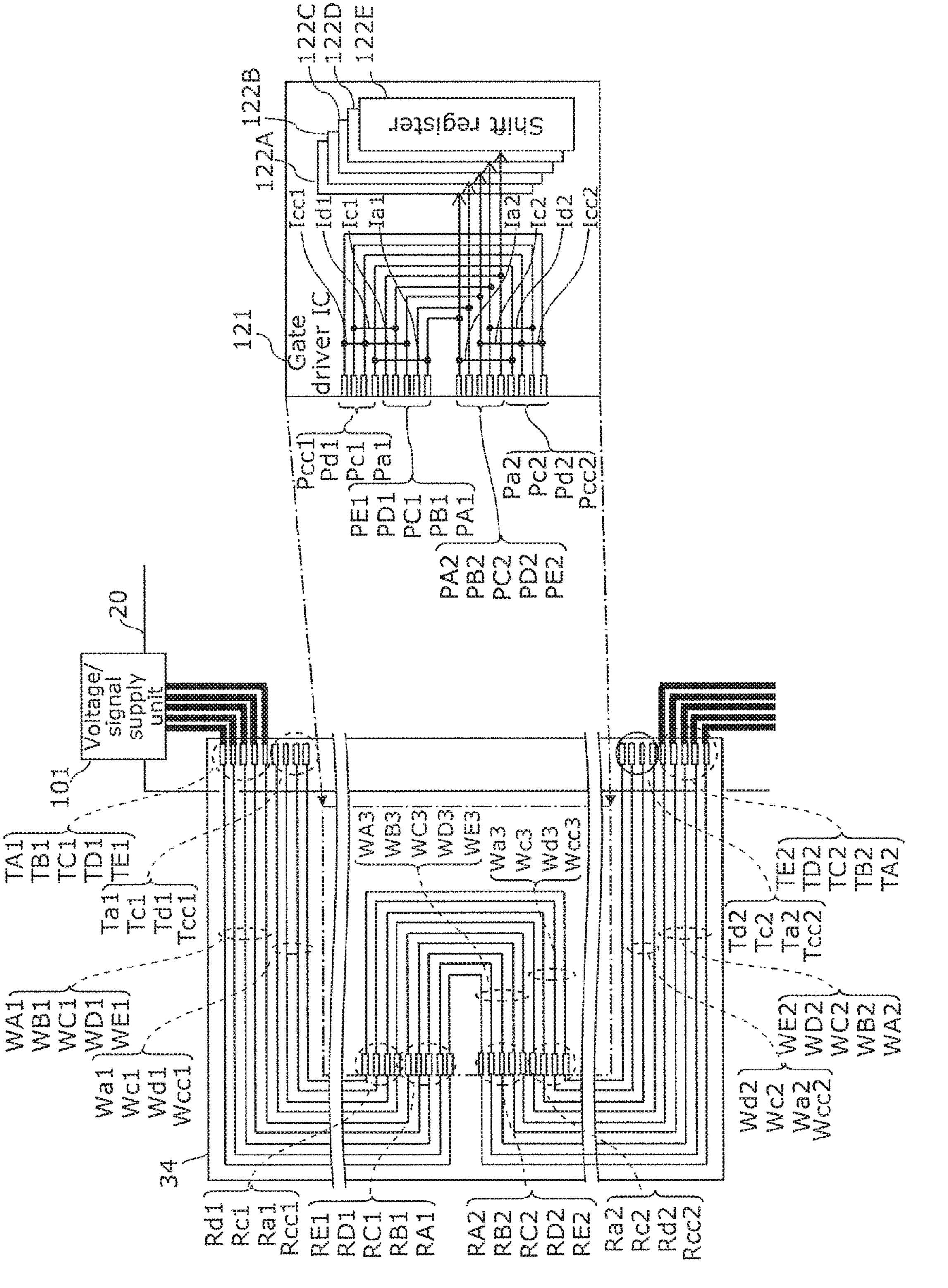
FIG. 19 is a diagram illustrating a configuration example of a COF substrate and a gate driver IC according to Embodiment 3.

FIG. 19 is a diagram illustrating a configuration example of a COF substrate 34 and a gate driver IC 121 according to a variation of Embodiment 3. Compared with FIG. 12, the variation example in the diagram is different in that: power supply terminals Pcc1 and Pcc2, internal lines Icc1 and Icc2, an internal line which connects the power supply terminals Pcc1 and Pcc2 are added in the gate driver IC 121; and power supply input terminals Icc1 and Icc2, pads Fcc1 and Rcc2, first to third power supply lines Wcc1, Wcc2, and Wcc3 are added in the COF substrate 34. Hereinafter, the differences are mainly described.

The respective power supply terminals Pcc1 and Pcc2 are power supply terminals provided redundantly.

The internal line Icc1 is a line present in the gate driver IC 121 which connects the power supply terminal Pcc1 and either the power supply terminal Pc1 or PC1. In this way, the power supply terminal Pcc1 has the same potential as the potential of the power supply terminals PC1 and Pc1. In other words, Pcc1 is a redundant power supply terminal having a potential which is maintained to be the same as the potential of the power supply terminal PC1, is also a redundant power supply terminal having a potential which is maintained to be the same as the potential of the power supply terminal Pc1, and is a terminal for power supply to the shift register 122C.

Likewise, the internal line Icc2 connects the power supply terminal Pcc2 and the power supply terminal Pc2 or PC2.

A power supply system in which the power supply input terminal Tcc1, the first power supply line Wcc1, the pad Rcc1, the third power supply line Wcc3, the pad Rcc2, the second power supply line Wcc2, and the power supply input terminal Tcc2 are connected in the listed order is referred to as a power supply system "cc".

The power supply system "cc" is connected to the power supply system "C" by the internal lines Icc1 and Icc2, and thus is substantially the same as the power supply system "C" and is also substantially the same as the power supply system "c". In other words, in order to increase the flexibility in designing power supply lines, the redundant power supply systems "cc" and "c" are provided for the power supply system "C".

While the three redundant power supply systems "a", "c", and "d" are provided in FIG. 12, the redundant power supply system "cc" is further added in FIG. 19. In this way, connection is possible even in the case (i) in FIG. 16A.

Figure 20A:
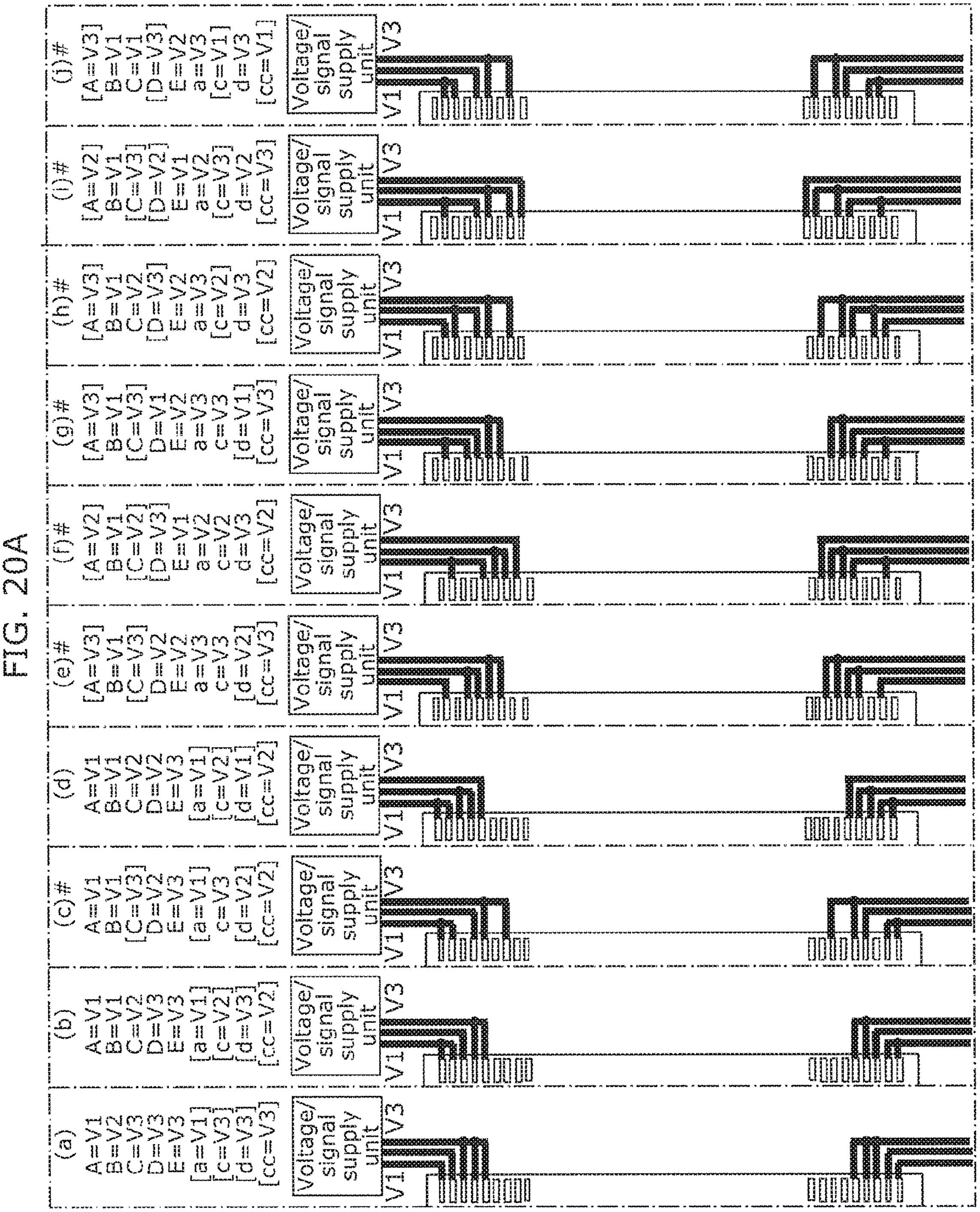
FIG. 20A is a diagram illustrating a connection example of power supply lines respectively corresponding to combinations in FIG. 15 according to Embodiment 3.
Figure 20B:
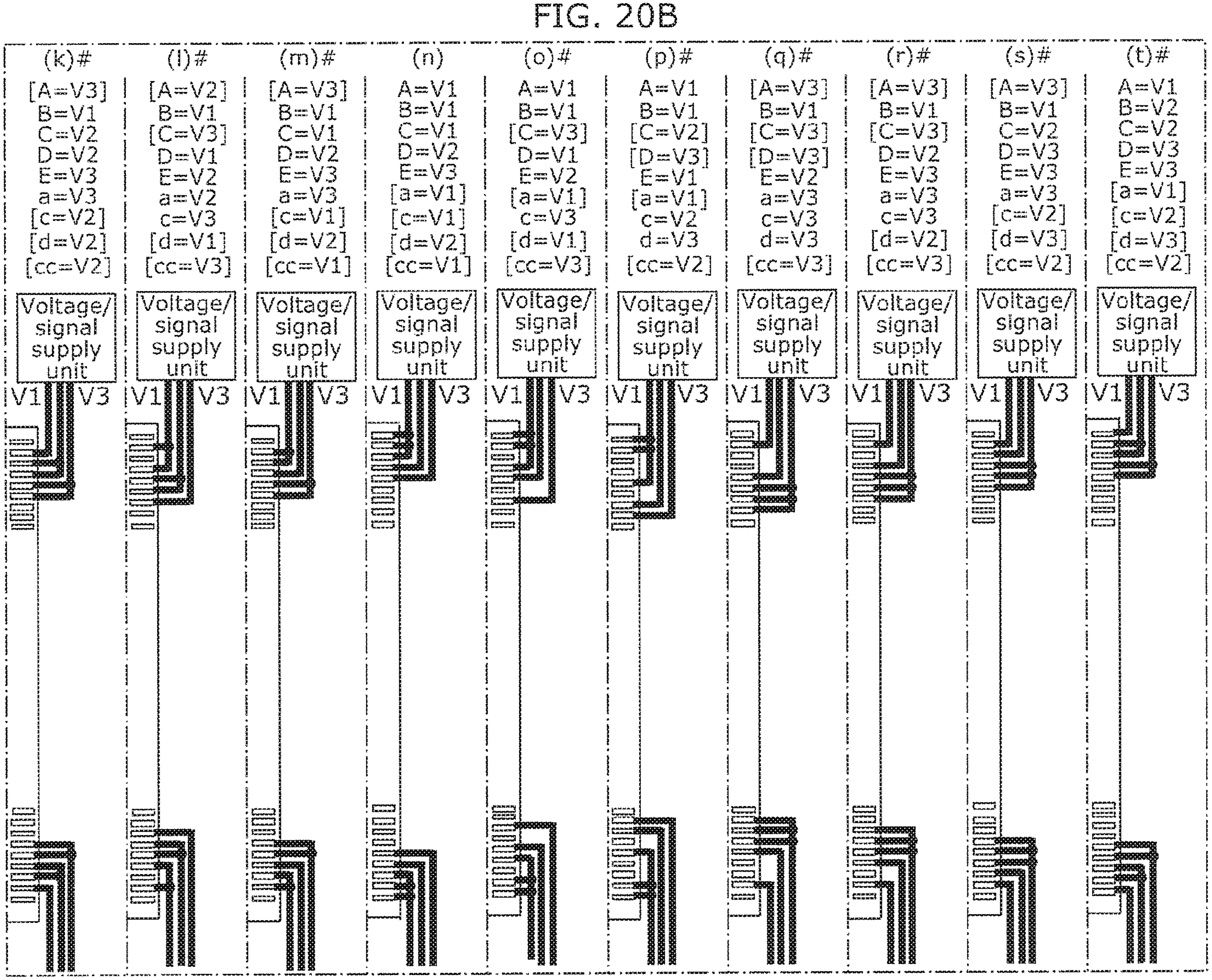
FIG. 20B is a diagram illustrating an example of wiring that follows the wiring in FIG. 16A according to Embodiment 3.
Figure 20C:
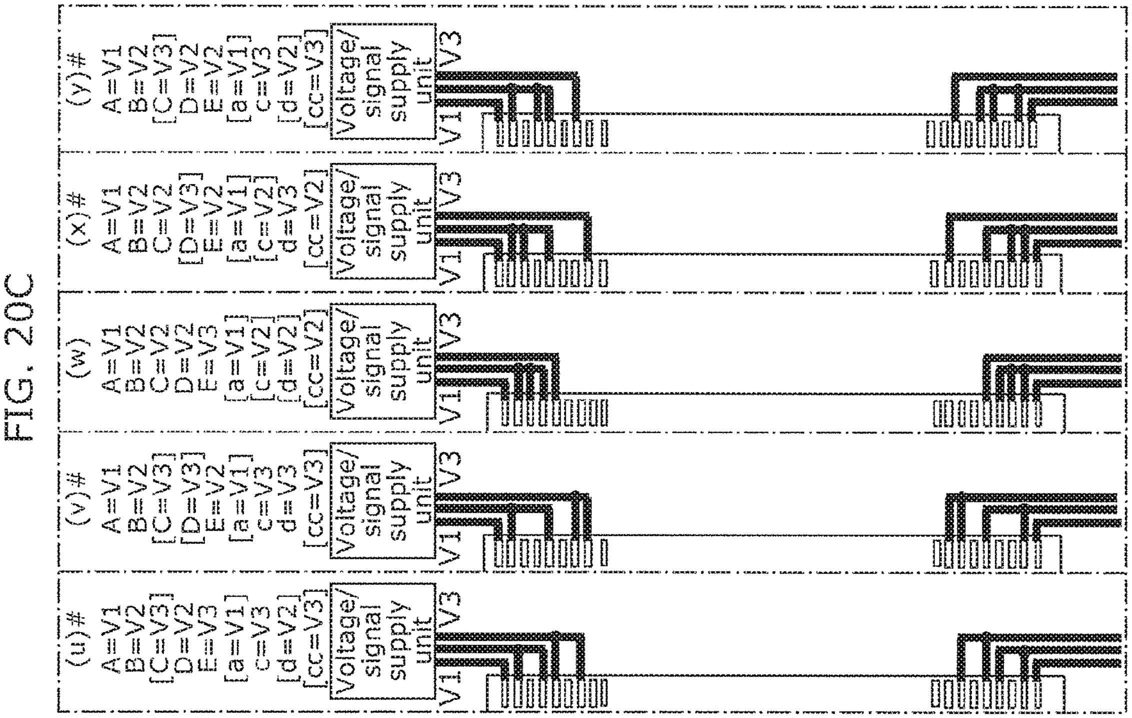
FIG. 20C is a diagram illustrating an example of wiring that follows the wiring in FIG. 16B according to Embodiment 3.

Each of FIGS. 20A to 20C is a diagram illustrating a connection example of power supply lines respectively corresponding to the combinations in FIG. 15. Compared with FIGS. 16A to 16C, FIGS. 20A to 20C additionally include the power supply input terminals Tcc1 and Tcc2. In addition, in the connection examples other than the case (i) in FIGS. 20A to 20C, the power supply input terminal Tcc1 (Tcc2) is not connected, and the other power supply input terminals are connected in the same manner as in FIGS. 16A to 16C.

In the example of the case (i) in FIG. 20A, wiring to the power supply input terminal Tcc1 (Tcc2) is performed so that the combination of the power supply voltages in the case (i) in FIG. 15 is possible. In other words, as for the (i) in FIG. 15, (i) cannot be connected in FIG. 16A but can be connected in FIG. 20A.

As illustrated in FIG. 15, combinations of shift registers to which power supply voltages V1, V2, and V3 are supplied are twenty-five patterns (a) to (y).

The five wiring examples (a), (b), (d), (n), and (w) in FIGS. 20A to 20C are possible without redundant power supply input terminals Ta1, Tc1, Td1, and Tcc1. However, the other twenty wiring patterns (c), (e) to (m), (o) to (v), (x), and (y) cannot be connected without the redundant power supply input terminals Ta1, Tc1, Td1, and Tcc1.

In this way, the flexibility in designing the power supply lines in the case where the number of power supply voltages is reduced from five to three in this variation increases from five to twenty-five patterns, and all of the combinations in FIG. 15 can be wired.

Figure 21:
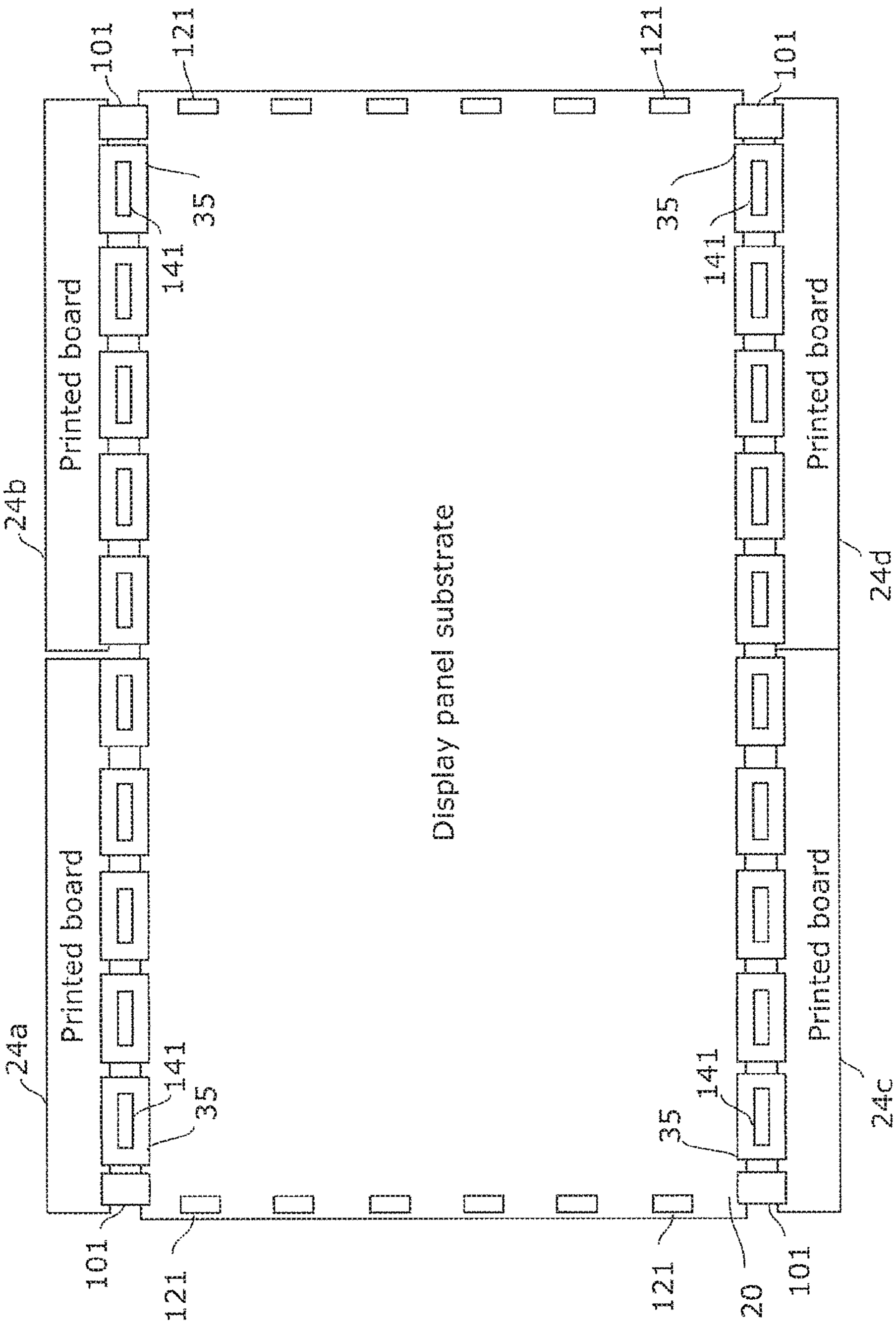
FIG. 21 is a block diagram illustrating a substrate configuration example of the display apparatus having a COG configuration according to Embodiment 1.

Although a gate driver circuit configured to have a COF substrate instead of a PCB substrate has been described in each of the embodiments, it is to be noted that a gate driver circuit having a chip on glass (COG) configuration is also possible. FIG. 21 is a block diagram illustrating a substrate configuration example of the display apparatus having a COG configuration. As in the same diagram, the gate driver IC 121 is directly mounted on the display panel substrate 20 without intervention of any film substrate. Even in this configuration, in the same manner as in each of the embodiments, a redundant power supply system in the gate driver IC 121 can increase the flexibility in designing power lines for the display panel substrate 20.

In addition, although examples of (N, k)=(4, 2), (3, 1), (5, 3), and (5, 4) have been described respectively in Embodiments 1, 2, and 3, (N, k) is not limited to these examples.

As described above, the gate driver IC according to an aspect of the present disclosure includes: N shift registers 122A to 122D (when N=4 is satisfied) which generate a gate signal to be supplied to a display panel substrate 20, N being a natural number; (N+k) power supply terminals PA1 to PD1, Pa1, and Pc1 (when k=2 is satisfied) for power supply from outside, k being a natural number; and (N+k) internal lines connected to the (N+k) power supply terminals, wherein N internal lines among the (N+k) internal lines connect, one-to-one, N power supply terminals among the (N+k) power supply terminals and the N shift registers, and k internal lines Ia2 and Ic2 (when k=2 is satisfied) other than the N internal lines among the (N+k) internal lines connect, one-to-one, k power supply terminals other than the N power supply terminals among the (N+k) power supply terminals and k internal lines selected from among the N internal lines.

With this configuration, the k power supply terminals are redundantly provided, and the k internal lines connect, one-to-one, the k power supply terminals and the k internal lines selected from among the N internal lines. Thus, a power supply voltage can be shared between power supply terminals which are not adjacent to each other among the N power supply terminals. In other words, in the gate driver IC, the COF substrate, and the display apparatus, it is possible to design the gate driver IC, the COF substrate, and the display apparatus to have a reduced or not reduced number of power supply lines. Therefore, the flexibility in designing the power supply lines is high, and thus it is possible to increase versatility.

Here, the gate driver IC may include a first power supply terminal group including the (N+k) power supply terminals; and a second power supply terminal group including the (N+k) power supply terminals for power supply from outside, wherein the (N+k) power supply terminals of the second power supply terminal group are connected one-to-one to the (N+k) internal lines.

This configuration is suitable for connecting the plurality of gate driver ICs in cascade.

In addition, a chip-on-film substrate according to an aspect of the present disclosure includes: the gate driver IC according to claim 1; a film substrate on which the gate driver IC is mounted; (N+k) power supply input terminals which are formed on the film substrate and receive a power supply voltage from the display panel substrate; (N+k) pads formed on the film substrate and connected to the (N+k) power supply terminals; and (N+k) first power supply lines which are formed on the film substrate and connect, one-to-one, the (N+k) power supply input terminals and the (N+k) pads.

This configuration includes the redundantly provided k power supply input terminals, and the k power supply output terminals. In this way, the power supply voltage to one of the redundantly provided k power supply input terminals is equivalent to the power supply voltage to one of the non-redundant power supply input terminals. In other words, the power supply voltage to a given one of the shift registers can be supplied from any of the redundantly provided power supply input terminals and the non-redundant power supply input terminals. In this way, it is possible to increase the flexibility in designing the power supply lines in the display panel substrate 20.

Here, the gate driver IC may include: a first power supply terminal group including the (N+k) power supply terminals; and a second power supply terminal group including the (N+k) power supply terminals for power supply from outside, k being a natural number, and the (N+k) internal lines connect, one-to-one, the (N+k) power supply terminals of the first power supply terminal group and the (N+k) power supply terminals of the second power supply terminal group, the chip-on-film substrate includes: a power supply input terminal group including the (N+k) power supply input terminals formed on the film substrate; a power supply output terminal group including the (N+k) power supply output terminals formed on the film substrate; a first pad group formed on the film substrate and connected to the first power supply terminal group; a second pad group formed on the film substrate and connected to the second power supply terminal group; a first line group including (N+k) first lines which are formed on the film substrate and connect, one-to-one, the (N+k) power supply input terminals of the power supply input terminal group and pads of the first pad group; a second line group including (N+k) second lines which are formed on the film substrate and connect, one-to-one, pads of the second pad group and the (N+k) power supply output terminals of the power supply output terminal group; and a third line group which are formed on the film substrate and connect, one-to-one, the pads of the first pad group and the pads of the second pad group.

This configuration is suitable for connecting the plurality of chip-on-films in cascade.

In addition, a display apparatus according to an aspect of the present disclosure includes: a chip-on-film substrate according to either claim 3 or claim 4; and the display panel substrate which supplies a power supply voltage to at least N power supply input terminals among the (N+k) power supply input terminals of the film substrate.

With this configuration, it is possible to select the design in which the number of power supply lines between the display panel substrate and the chip-on-film substrate is reduced or the design in which the same is not reduced. Therefore, the flexibility in designing the connection of the power supply lines is high, and thus it is possible to increase versatility.

Here, at least one and at most k power supply input terminals among the (N+k) power supply input terminals may not be connected to any of the lines formed on the display panel substrate.

In addition, a display apparatus according to another aspect of the present disclosure includes: the gate driver IC; and a display panel substrate which supplies a power supply voltage to at least N power supply terminals among the (N+k) power supply terminals.

With this configuration, it is possible to select the design in which the number of power supply lines between the display panel substrate and the gate driver IC is reduced or the design in which the same is not reduced. Therefore, the flexibility in designing the connection of the power supply lines is high, and thus it is possible to increase versatility.

Here, at least one and at most k power supply terminals among the (N+k) power supply terminals may not be connected to any of the lines formed on the display panel substrate.

The gate driver IC, the chip-on-film substrate, and the display apparatus using the same have been described above based on the embodiments. However, the present disclosure is not limited to the embodiments. The one or plural aspects include, in the scope, various kinds of modifications conceivable by a person skilled in the art and embodiments obtainable by combining some of constituent elements in different embodiments.

Accordingly, the constituent elements illustrated in the attached drawing and described in the detailed descriptions include not only constituent elements that are essential to solve the problem but also constituent elements that are not essential to solve the problem. For this reason, it should not be directly asserted that the non-essential constituent elements are essential based on the fact that the non-essential constituent elements are illustrated in the attached drawings and are described in the detailed descriptions.

The above embodiment is provided as an example for illustrating the present disclosure, and thus various kinds of modification, replacement, addition, omission, etc. may be made in the scope of the Claims or the equivalents.

INDUSTRIAL APPLICABILITY

The present disclosure is applicable to (i) gate driver ICs of flat-panel type display apparatuses such as television receivers and information devices, (ii) COF substrates, and display apparatuses using the COF substrates.

The invention claimed is:

1. A gate driver IC, comprising:

N shift registers, which generate a gate signal to be supplied to a display panel substrate, N being a natural number greater than or equal to four;

only (N+k) power supply terminals for power supply from outside, k being a natural number greater than or equal to two and a number of redundant power supply terminals;

(N+k) internal lines connected to the (N+k) power supply terminals;

a first power supply terminal group including the (N+k) power supply terminals for receiving power supply from inside the gate driver IC; and a second power supply terminal group, which is independent from the first power supply group, including the (N+k) power supply terminals for receiving power supply from a separate power supply outside the gate driver IC, wherein the (N+k) power supply terminals of the second power supply terminal group are connected one-to-one to the (N+k) internal lines, wherein N non-redundant internal lines among the (N+k) internal lines, connect one-to-one to non-redundant N power supply terminals among the (N+k) power supply terminals, and are directly connected to the N shift registers, wherein separate k internal lines other than the N non-redundant internal lines and k redundant internal lines among the (N+k) internal lines connect, one-to-one, k redundant power supply terminals other than the N non-redundant power supply terminals among the (N+k) power supply terminals and k internal lines selected from among the N non-redundant internal lines, wherein the non-redundant power supply terminals are directly connected to the separate power supply outside the gate driver IC while the redundant power supply terminals are not directly connected to the separate power supply;

wherein a shift register is provided for each of the non-redundant power supply terminals, and wherein a separate voltage signal supply line is provided from a voltage signal supply unit to each of the non-redundant power supply terminals.

2. A chip-on-film substrate, comprising:

the gate driver IC according to claim 1;

a film substrate on which the gate driver IC is mounted;

(N+k) power supply input terminals which are formed on the film substrate and receive a power supply voltage from the display panel substrate;

(N+k) pads formed on the film substrate and connected to the (N+k) power supply terminals; and (N+k) first power supply lines which are formed on the film substrate and connect, one-to-one, the (N+k) power supply input terminals and the (N+k) pads.

3. The chip-on-film substrate according to claim 2, wherein the gate driver IC includes:

a first power supply terminal group including the (N+k) power supply terminals; and a second power supply terminal group including the (N+k) power supply terminals for power supply from outside, and the (N+k) internal lines connect, one-to-one, the (N+k) power supply terminals of the first power supply terminal group and the (N+k) power supply terminals of the second power supply terminal group, the chip-on-film substrate includes:

a power supply input terminal group including the (N+k) power supply input terminals formed on the film substrate;

a power supply output terminal group including the (N+k) power supply output terminals formed on the film substrate;

a first pad group formed on the film substrate and connected to the first power supply terminal group;

a second pad group formed on the film substrate and connected to the second power supply terminal group;

a first line group including (N+k) first lines which are formed on the film substrate and connect, one-to-one, the (N+k) power supply input terminals of the power supply input terminal group and pads of the first pad group;

a second line group including (N+k) second lines which are formed on the film substrate and connect, one-to-one, pads of the second pad group and the (N+k) power supply output terminals of the power supply output terminal group; and a third line group which are formed on the film substrate and connect, one-to-one, the pads of the first pad group and the pads of the second pad group.

4. A display apparatus, comprising:

a chip-on-film substrate according to claim 2; and the display panel substrate which supplies a power supply voltage to at least N power supply input terminals among the (N+k) power supply input terminals of the film substrate.

5. The display apparatus according to claim 4, wherein at least one and at most k power supply input terminals among the (N+k) power supply input terminals are not connected to any of the lines formed on the display panel substrate.

6. A display apparatus, comprising:

the gate driver IC according to claim 1; and a display panel substrate which supplies a power supply voltage to at least N power supply terminals among the (N+k) power supply terminals.

7. The display apparatus according to claim 6, wherein at least one and at most k power supply terminals among the (N+k) power supply terminals are not connected to any of the lines formed on the display panel substrate.

* * * * *